US012314010B2

(12) United States Patent
Rudaz

(10) Patent No.: US 12,314,010 B2
(45) Date of Patent: May 27, 2025

(54) DEVICE FOR SELECTING TIMEPIECE FUNCTIONS

(71) Applicant: ROLEX SA, Geneva (CH)

(72) Inventor: Denis Rudaz, Segny (FR)

(73) Assignee: ROLEX SA, Geneva (CH)

( * ) Notice: Subject to any disclaimer, the term of this patent is extended or adjusted under 35 U.S.C. 154(b) by 568 days.

(21) Appl. No.: 17/684,381

(22) Filed: Mar. 1, 2022

(65) Prior Publication Data

US 2022/0283547 A1 Sep. 8, 2022

(30) Foreign Application Priority Data

Mar. 4, 2021 (EP) .................................... 21160828

(51) Int. Cl.
*G04B 27/02* (2006.01)
*G04B 19/24* (2006.01)

(52) U.S. Cl.
CPC ........... *G04B 27/026* (2013.01); *G04B 19/24* (2013.01)

(58) Field of Classification Search
CPC .............................. G04B 27/026; G04B 19/24
See application file for complete search history.

(56) References Cited

U.S. PATENT DOCUMENTS 3,748,848 A 7/1973 Laesser et al.
3,779,000 A 12/1973 Schmid
3,890,778 A 6/1975 Aeschmann
4,423,964 A 1/1984 Griessen et al.
8,644,116 B2 2/2014 Gabathuler et al.
9,042,206 B2 5/2015 Gabathuler et al.
9,170,563 B2 10/2015 Rudaz et al.
9,360,842 B2 6/2016 Neboisa et al.
9,405,274 B2 8/2016 Cattaneo et al.
9,841,734 B2 12/2017 Merino et al.
11,550,267 B2 1/2023 Wagnière
2008/0159081 A1 7/2008 Laucella et al.
2012/0182838 A1 7/2012 Farron et al.
2013/0051183 A1 2/2013 Gabathuler et al.
(Continued)

FOREIGN PATENT DOCUMENTS

CH 620968 A 3/1972
CH 577197 B5 6/1976
(Continued)

OTHER PUBLICATIONS

Office Action dated Aug. 14, 2024 in co-pending U.S. Appl. No. 17/684,386; with PTO892; without returned SB08 (total 14 pages).
(Continued)

*Primary Examiner* — Edwin A. Leon
*Assistant Examiner* — Jason M Collins
(74) *Attorney, Agent, or Firm* — Seckel IP, PLLC

(57) ABSTRACT

A device (200; 200') for selecting timepiece functions, including a setting lever device (150; 150') and a frame (100; 100'), the setting lever device (150; 150') comprising-including a setting lever (2; 2') mounted movably on the frame (100; 100') and a lever (3; 3') mounted movably on the frame (100; 100') or on the setting lever (2; 2'), the selection device (200; 200') also including a first position indexing device (4; 4') arranged so as to act on the setting lever (2; 2'), and a second position indexing device (5; 5') arranged so as to act on the lever (3; 3").

23 Claims, 11 Drawing Sheets

(56) References Cited

U.S. PATENT DOCUMENTS

| | | | |
|---|---|---|---|
| 2014/0160897 A1 | 6/2014 | Gabathuler et al. | |
| 2014/0177397 A1 | 6/2014 | Rudaz et al. | |
| 2014/0321247 A1 | 10/2014 | Cattaneo et al. | |
| 2016/0124388 A1 | 5/2016 | Neboisa et al. | |
| 2017/0075307 A1 | 3/2017 | Merino et al. | |
| 2018/0107163 A1* | 4/2018 | Bonvin .................. | G04B 27/02 |
| 2019/0163139 A1 | 5/2019 | McDonnell | |
| 2020/0026242 A1 | 1/2020 | Wagnière | |

FOREIGN PATENT DOCUMENTS

| | | | |
|---|---|---|---|
| CH | 702548 | A2 | 7/2011 |
| CH | 702803 | A2 | 9/2011 |
| EP | 1939699 | A1 | 7/2008 |
| EP | 2453322 | A1 | 5/2012 |
| JP | S52-156664 | A | 12/1977 |
| WO | 2012175595 | A1 | 12/2012 |
| WO | 2013030268 | A1 | 3/2013 |

OTHER PUBLICATIONS

European Search Report and Written Opinion dated Jul. 12, 2021 in priority application No. EP2021160829.4 of co-pending U.S. Appl. No. 17/684,386; with English machine translation (total 14 pages) WO2013030268, D3 cited in the priority ESR of the co-pending application is not listed in this IDS since it is already listed in the other IDS form).

European Search Report and Written Opinion dated Jul. 13, 2021 in priority application No. EP2021160830.2 of co-pending U.S. Appl. No. 17/684,389; with English machine translation (total 14 pages).

European Search Report and Written Opinion dated Jul. 9, 2021 in priority application No. EP2021160828.6; with English machine translation (total 12 pages).

Office Action dated Aug. 15, 2024 in co-pending U.S. Appl. No. 11/550,267; with PTO892; without returned SB08 (total 14 pages) (note: U.S. Pat. No. 9360842, ref.A and U.S. Appl. No. 11/550,267, ref.D cited in the Office Action are not listed in this IDS since they are already of record).

* cited by examiner

DEVICE FOR SELECTING TIMEPIECE FUNCTIONS

CROSS-REFERENCE TO RELATED APPLICATION

This application claims priority of European patent application No. EP21160828.6 filed Mar. 4, 2021, the content of which is hereby incorporated by reference herein in its entirety.

FIELD OF THE INVENTION

The invention relates to a device for selecting timepiece functions. The invention also relates to a timepiece mechanism comprising such a selection device. The invention also relates to a timepiece movement comprising such a selection device or such a mechanism. The invention also relates to a timepiece comprising such a movement or such a selection device or such a mechanism. Lastly, the invention relates to a method for operating such a timepiece or such a movement or such a selection device or such a mechanism.

BACKGROUND ART

A mechanism provided with a three-position control stem is generally provided to allow the adjustment of a timepiece comprising an additional function, for example a calendar or a second time zone, which needs to be adjusted.

The “2” position or intermediate position of the stem is not always easy to reach by the user of a timepiece, in particular of a watch, and there is a risk of this stem passing directly from the first position (“1” position) to the last position (“3” position) without it being able to be put stably in the intermediate position (“2” position) on account in particular of the axial forces required to actuate it. With such a risk, it will thus be understood that it would be tricky to add yet another intermediate stem position dedicated to adjusting another, additional function. Consequently, with a fourth stem position, the travel of the stem would be increased, and this would present difficulties in terms of space requirement, both with regard to the movement and with regard to the crown wheel of the watch. To remedy this, one solution would consist in reducing the travel between the axial positions of the stem, but this would make it even trickier to select the functions.

As a result, watches equipped, for example, with a time zone, a phase of the moon or an annual, semi-perpetual or perpetual calendar generally have at least one additional interface means in addition to the control stem in order for it to be possible to select and adjust several additional functions. This additional interface means may for example be in the form of a pushbutton or of a selection bezel.

The multiplication of the interface means risks making the adjustment of the timepiece more complex. It also involves constraints in terms of design simply because of the need to provide them within the watch.

The document EP2453322 describes a chronograph movement equipped with a mechanism comprising a stem having three stable axial positions. The particular feature of this mechanism lies in the fact that it makes it possible to adjust an additional time-related function by actuating one of the pushbuttons of the chronograph when the control stem is not in a first position. More particularly, when the stem of the mechanism is in the first position, the pushbutton makes it possible to interact with the chronograph, whereas when the stem is in another position, the pushbutton makes it possible to adjust an additional time-related function.

The document EP1939699 discloses a mechanism having a particular arrangement of a crown wheel provided for selecting and adjusting different functions. Unlike a mechanism provided with a conventional interface employing a control stem, rotation of this crown wheel makes it possible to select the function to be adjusted, and pressing said crown wheel makes it possible to adjust the previously selected function. Adjustment is therefore effected incrementally, since it is possible to do it with a simple corrector.

The document CH702803 describes a mechanism comprising a stem having three stable axial positions and also comprising a crown wheel and a pushbutton, which are preferably coaxial. In one of the axial positions of the stem, the rotation of the crown wheel makes it possible to select an adjustment function, and the actuation of the pushbutton makes it possible to incrementally adjust the previously selected function.

The document CH702548 describes a mechanism for selecting three configurations of a selection device; the winding of the movement in a first configuration, the adjustment of a time zone in a second configuration, and time setting in a third configuration. The selection of the configuration of this mechanism is done by pressing a crown wheel, like a pushbutton. The rotation of the crown wheel allows winding or adjustment of the previously selected function.

SUMMARY OF THE INVENTION

The documents identified in the context of this prior art set forth alternative solutions to the mechanisms conventionally provided with a single control stem. Although some of these solutions make it possible to adjust more functions than a three-position control stem, they all have the drawback of requiring a second interface means such as a pushbutton, which is or is not coaxial with the crown wheel, and/or sequential selection of the different functions. Such mechanisms, which employ sequential selection of the different functions, may also require an additional display means in order to allow the user to know the function selected, and this may have a negative effect on the appearance of the timepiece. Furthermore, even though the use of a pushbutton provided to allow the adjustment of an additional function of the movement is known and very widely utilized, it is not easy to arrange both with regard to the space requirement and to the sealing of the watch. Moreover, the employment of a pushbutton means that adjustment is incremental, this not being suitable for certain functions such as the manual winding of a movement or setting the time, for example.

The aim of the invention is to provide a device for selecting timepiece functions that makes it possible to improve the devices for selecting timepiece functions that are known from the prior art. In particular, the invention proposes a device for selecting timepiece functions that is particularly reliable and easy to use and makes it possible to obtain at least four configurations for selecting timepiece functions.

According to a first aspect of the invention, subjects are defined by the following propositions:

1. A device (200; 200') for selecting timepiece functions, comprising:

a setting lever device (150; 150'), and a frame (100; 100'), the setting lever device (150; 150') comprising a setting lever (2; 2') mounted movably on the frame (100; 100')

and a lever (3; 3') mounted movably on the frame (100; 100') or on the setting lever (2; 2')

the selection device (200; 200') also comprising:

a first position indexing device (4; 4') arranged so as to act on the setting lever (2; 2'), and a second position indexing device (5; 5') arranged so as to act on the lever (3; 3').

2. The selection device (200; 200') as proposed in proposition 1, wherein it comprises an interface element (1), in particular a control stem (1), and wherein the setting lever (2; 2') is engaged directly with the interface element (1), in particular via a first setting lever stud (21; 21') fitted in a groove (1*a*) of the interface element (1).

3. The selection device (200; 200') as proposed in either of propositions 1 and 2, wherein the setting lever (2; 2') and the lever (3; 3') are pivoted about one and the same axis (A2; A2').

4. The selection device (200; 200') as proposed in one of propositions 1 to 3, wherein the selection device (200; 200'), in particular the setting lever device (150; 150'), comprises a pawl member (6; 6') arranged so as to secure the setting lever (2; 2') and the lever (3; 3').

5. The selection device (200; 200') as proposed in proposition 4, wherein the pawl member (6; 6') is pivoted on the lever (3; 3') and arranged so as to cooperate with a second stud (23; 23') of the setting lever (2; 2').

6. The selection device (200; 200') as proposed in proposition 5, wherein the lever (3; 3') comprises an elongate cutout (31; 31') cooperating with the second stud (23; 23') of the setting lever (2; 2'), so as to kinematically connect the setting lever (2; 2') and the lever (3; 3') during the movement of the interface element (1).

7. The selection device (200; 200') as proposed in either of propositions 5 and 6, wherein the pawl member (6; 6') is arranged so as to cooperate with the second stud (23; 23') through the elongate cutout (31; 31') formed in the lever (3; 3').

8. The selection device (200; 200') as proposed in one of propositions 4 to 7, wherein the frame (100; 100') comprises a profile (99; 99') cooperating with the pawl member (6; 6') so as to at least partially control the position of the pawl member (6; 6') depending on the position of the setting lever (2; 2') and/or of the lever (3; 3').

9. The selection device (200; 200') as proposed in one of propositions 1 to 8, wherein the first position indexing device (4; 4') comprises a first spring (41; 41') provided with a first functional surface (42; 42') and a third stud (22; 22') of the setting lever (2; 2'), the first functional surface (42; 42') and the setting lever (2; 2'), in particular the third stud (22; 22'), cooperating by contact.

10. The selection device (200) as proposed in one of propositions 1 to 9, wherein the second position indexing device (5) comprises a second spring (51) provided with a second functional surface (52) and a mobile (7) kinematically connected to, in particular in meshing engagement with, the lever (3), the mobile (7) comprising a third functional surface (72) cooperating with the second functional surface (52).

11. The selection device (200') as proposed in one of propositions 1 to 9, wherein the second position indexing device (5') comprises a second spring (51') provided with a second functional surface (52') and a fourth stud (34') of the lever (3'), the second functional surface (52') and the lever (3'), in particular the fourth stud (34'), cooperating by contact.

12. The selection device (200; 200') as proposed in one of propositions 1 to 11 and as proposed in proposition 2, wherein the setting lever device (150; 150'), the first position indexing device (4; 4') and the second position indexing device (5; 5') are arranged such that a stable position of the interface element (1) is determined either by the first position indexing device (4; 4') or by the second position indexing device (5; 5').

13. A timepiece mechanism (800; 800') comprising a device (200; 200') for selecting timepiece functions as proposed in one of propositions 1 to 12.

14. A timepiece movement (900; 900') comprising a device (200; 200') for selecting timepiece functions as proposed in one of propositions 1 to 12 and/or a timepiece mechanism (800; 800') as proposed in proposition 13.

15. A timepiece (1000; 1000') comprising a device (200; 200') for selecting timepiece functions as proposed in one of propositions 1 to 12 and/or a timepiece mechanism (800; 800') as proposed in proposition 13 and/or a timepiece movement (900; 900') as proposed in proposition 14.

According to a second aspect of the invention, subjects are defined by the following propositions:

16. A device (200; 200') for selecting timepiece functions, comprising:

a frame (100; 100'), an interface element (1), in particular a control stem (1), and a setting lever device (150; 150'), the setting lever device (150; 150') being arranged so as to define:

n stable positions of the interface element (1), where n≥3, and m selection configurations of the selection device (200; 200'), where m≥n+1.

17. The selection device (200; 200') as proposed in proposition 16, wherein the setting lever device (150; 150') is arranged so as to define at least two separate selection configurations of the selection device (200; 200') for a single stable position (P2) of the interface element (1).

18. The selection device (200; 200') as proposed in proposition 17, wherein the single stable position (P2) of the interface element (1) is an intermediate stable position (P2) of the interface element (1) positioned between two stable end positions (P1), (P3) of the interface element (1).

19. The selection device (200; 200') as proposed in one of propositions 16 to 18, wherein a first end position (P1) of the interface element (1), which is stable and pushed the furthest into the frame (100; 100'), makes it possible to define a first configuration (C1) of the selection device (200; 200') which makes it possible to actuate a manual winding train of a timepiece movement (900; 900').

20. The selection device (200; 200') as proposed in one of propositions 16 to 19, wherein the selection device is arranged such that a second, intermediate stable position (P2) of the interface element (1) makes it possible to define:

a second configuration (C2) of the device for selecting functions which makes it possible to actuate a first, one-way or two-way adjustment train for adjusting a function for indicating a first item of time-related information, and a third configuration (C3) of the device for selecting functions which makes it possible to actuate a second, one-way or two-way adjustment train for adjusting a function for indicating a second item of time-related information.

21. The selection device (200; 200') as proposed in proposition 20, wherein the first adjustment train is an adjustment train for adjusting an indication of the date, and wherein the second adjustment train is an adjustment train for adjusting an indication of the day.

22. The selection device (200; 200') as proposed in proposition 20, wherein the first adjustment train is an adjustment train for adjusting an indication of a time zone, and wherein the second adjustment train is an adjustment train for adjusting an indication of the date.

23. The selection device (200; 200') as proposed in one of propositions 16 to 22, wherein a third end position (P3) of the interface element (1), which is stable and pulled the furthest out of the frame (100; 100'), makes it possible to define a fourth configuration (C4) of the selection device which makes it possible to actuate an adjustment train for adjusting the time.

24. The selection device (200; 200') as proposed in one of propositions 16 to 23, wherein the setting lever device (150; 150') comprises a setting lever (2; 2') mounted movably on the frame (100; 100') and a lever (3; 3') mounted movably on the frame (100; 100') or on the setting lever (2; 2'), the selection device (200; 200') also comprising:

- a first position indexing device (4; 4') arranged so as to act on the setting lever (2; 2'), and
- a second position indexing device (5; 5') arranged so as to act on the lever (3; 3').

25. A timepiece mechanism (800; 800') comprising a device (200; 200') for selecting timepiece functions as proposed in one of propositions 16 to 24.

26. A timepiece movement (900; 900') comprising a device (200; 200') for selecting timepiece functions as proposed in one of propositions 16 to 24 and/or a timepiece mechanism as proposed in proposition 25.

27. A timepiece (1000; 1000') comprising a device (200; 200') for selecting timepiece functions as proposed in one of propositions 16 to 24 and/or a timepiece mechanism as proposed in proposition 25 and/or a timepiece movement as proposed in proposition 26.

28. A method for operating a device (200; 200') for selecting timepiece functions as proposed in one of propositions 16 to 24 or a timepiece mechanism as proposed in proposition 25 or a timepiece movement as proposed in proposition 26 or a timepiece as proposed in proposition 27, the interface element (1) comprising a second, intermediate stable position (P2) positioned between a first stable position (P1) and a third stable position (P3), the method comprising the following steps:

- configuring the selection device (200; 200') in a second configuration (C2) when the interface element (1) is moved from the first stable position (P1) to the second, intermediate stable position (P2), and
- configuring the selection device (200; 200') in a third configuration (C3) when the interface element (1) is moved back and forth from the second, intermediate stable position (P2), in particular in a first direction of traction, and back into the second, intermediate stable position (P2).

29. The operating method as proposed in proposition 28, wherein the selection device (200; 200') is configured in a third configuration (C3) when the interface element (1) is moved from the third stable position (P3) to the second, intermediate stable position (P2).

According to a third aspect of the invention, subjects are defined by the following propositions:

30. A timepiece mechanism (800; 800') for correcting a timepiece function, comprising:

- a first lever (14) comprising a first cam desmodromic connecting element (14*a*),
- a correcting mobile (404), and
- a second lever (402), the second lever (402) comprising:
  - at least one first element (402*d*) for guiding the correcting mobile (404), notably for guiding the correcting mobile (404) in rotation about an axis that is fixed regarding the second lever,
  - at least one first friction element (402*b*) in contact with the correcting mobile (404), and
  - a second cam desmodromic connecting element (402*a*) provided to cooperate by contact with the first cam desmodromic connecting element (14*a*).

31. The mechanism as proposed in proposition 30, wherein the first cam desmodromic connecting element is a stud (14*a*) and the second cam desmodromic connecting element is a cam profile (402*a*), or wherein the first cam desmodromic connecting element is a cam profile and the second cam desmodromic connecting element is a stud.

32. The mechanism as proposed in proposition 31, wherein the cam profile (402*a*) is made up of a groove (402*a*) that is provided with at least two separate portions (1402*a*, 2402*a*), or three separate portions (1402*a*, 2402*a*, 3402*a*).

33. The mechanism as proposed in propositions 30 to 32, wherein the second lever (402) comprises at least one arm (402*c*), and wherein the first friction element (402*b*) comprises at least one friction surface (402*f*), the at least one arm (402*c*) being arranged so as to elastically return the at least one friction surface (402*f*) against the correcting mobile (404).

34. The mechanism as proposed in one of propositions 30 to 33, wherein the at least one first guiding element (402*d*) and the at least one first friction element (402*b*) are coincident or formed by one and the same element.

35. The mechanism as proposed in one of propositions 30 to 34, wherein the second lever is in one piece, and/or wherein the second lever has a thickness less than 200 μm, or even less than 150 μm.

36. The mechanism as proposed in one of propositions 30 to 35, wherein the first lever (14) and the second lever (402) are configured and/or arranged so as to position the second lever (402) in a first angular position and a second angular position about an axis of rotation (402*e*) of said second lever (402), the first angular position making it possible to activate a first corrective function, in particular a corrective function for the indication of the date, and the second angular position making it possible to deactivate the first corrective function.

37. The mechanism as proposed in one of propositions 30 to 36, wherein the first lever (14) and the second lever (402) are configured and/or arranged so as to allow the second lever (402) to be positioned in a third angular position about its axis of rotation (402*e*), making it possible to activate a second corrective function, in particular a corrective function for the indication of the day.

38. The mechanism as proposed in propositions 36 and 37, wherein the first lever (14) and the second lever (402) are configured and/or arranged such that, in the second angular position, the second corrective function is deactivated.

39. The mechanism as proposed in one of propositions 30 to 38, wherein the mechanism comprises a selection device (200) comprising a setting lever device (150) including a setting lever (2) and a third lever (3), and wherein the first lever (14) is controlled by the selection device (200), the setting lever device (150) and the first lever (14) being configured and/or arranged such that the first lever (14) is positioned by the setting lever (2) or by a profile (74) of a control mobile (7) kinematically connected to the third lever (3).

40. The mechanism as proposed in proposition 39, wherein the mechanism comprises an interface element (1), and wherein the mechanism is arranged such that, when the selection device (200) is configured in a first configuration (C1) corresponding to a first axial position (P1) of the interface element (1), the second lever (402) is in the second angular position, in which the first and second corrective functions are deactivated.

41. The mechanism as proposed in either of propositions 39 and 40, wherein the mechanism comprises an interface element (1), and wherein the mechanism is arranged such that, when the selection device (200) is configured in a second configuration (C2), corresponding to a second axial position (P2) of the interface element (1), the second lever (402) features the first angular position, in which the first corrective function is activated.

42. The mechanism as proposed in one of propositions 39 to 41, wherein the mechanism comprises an interface element (1), and wherein the mechanism is arranged such that, when the selection device (200) is configured in a third configuration (C3), corresponding to the second axial position (P2) of the interface element (1), the second lever (402) is able to feature a third angular position, in which the second corrective function is activated.

43. The mechanism as proposed in one of propositions 39 to 42, wherein the mechanism comprises an interface element (1), and wherein the mechanism is arranged such that, when the selection device (200) is configured in a fourth configuration (C4), corresponding to a third axial position (P3) of the interface element (1), the second lever (402) is in the second angular position, in which the first and second corrective functions are deactivated.

44. A timepiece movement (900; 900') comprising a timepiece mechanism (800; 800') as proposed in propositions 30 to 43.

45. A timepiece (1000; 1000') comprising a timepiece mechanism as proposed in one of propositions 30 to 43 and/or a timepiece movement as proposed in proposition 44.

Unless technically or logically incompatible, a subject may comprise any combination of features in the first, second and third aspects.

BRIEF DESCRIPTION OF THE DRAWINGS

The appended drawings depict, by way of examples, two embodiments of a timepiece.

FIG. 3 is an exploded perspective view of a first and a second setting lever.

FIG. 4 is an exploded perspective view of a control mobile.

FIGS. 5 and 6 are partial top views of a first configuration of a selection device.

FIGS. 7 and 8 are partial top views of a second configuration of the selection device.

FIGS. 9 and 10 are partial top views between the second configuration and a third configuration of the selection device, a stem being in an unstable position.

FIGS. 11 and 12 are partial top views of the third configuration of the selection device.

FIGS. 13 and 14 are partial top views of a fourth configuration of the selection device.

FIG. 16 is an exploded perspective view of a first and a second setting lever.

FIG. 17 is a partial top view of a first configuration of a selection device.

FIG. 18 is a partial top view of a second configuration of the selection device.

FIG. 19 is a partial top view between the second configuration and a third configuration of the selection device, a stem being in an unstable position.

FIG. 20 is a partial top view of the third configuration of the selection device.

FIG. 21 is a partial top view in a fourth configuration of the selection device.

DETAILED DESCRIPTION OF PARTICULAR EMBODIMENTS

Figure 1:
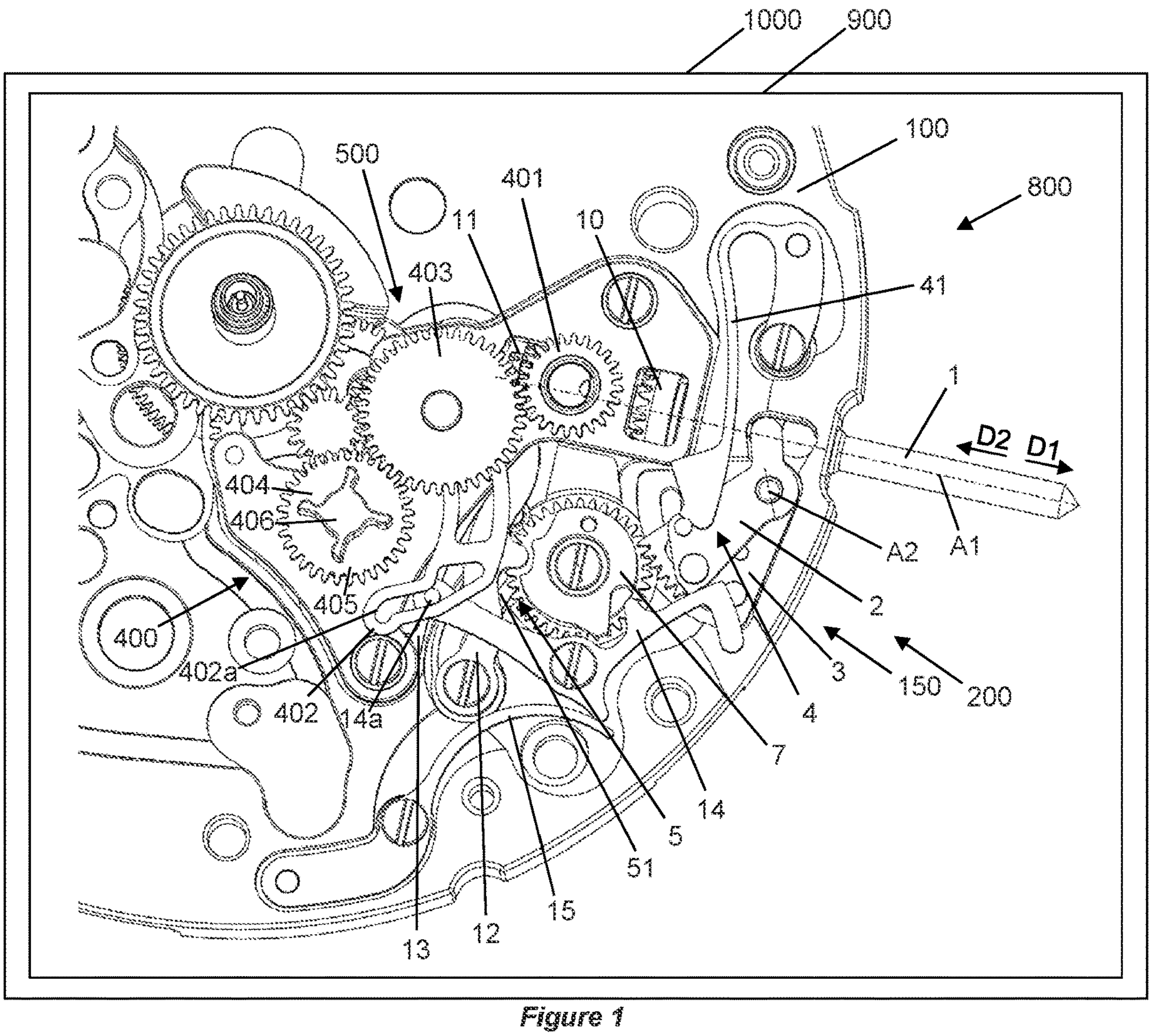
FIG. 1 is a schematic view of a first embodiment of a timepiece.

A first embodiment of a timepiece 1000 is described below with reference to FIGS. 1 to 14.

The timepiece 1000 is for example a watch, in particular a wristwatch.

The timepiece 1000 comprises a timepiece movement 900 intended to be mounted in a timepiece casing or case in order to protect it from the external environment.

The timepiece movement 900 may be an electronic movement or a mechanical movement, in particular an automatic movement. The timepiece movement 900 comprises a timepiece mechanism 800.

The timepiece 1000, in particular the timepiece movement 900, notably the timepiece mechanism 800, comprises a device 200 for selecting timepiece functions. The timepiece 1000, in particular the timepiece movement 900, notably the timepiece mechanism 800, also preferably comprises:

a winding drivetrain 300, a first adjustment drivetrain 400, and a second adjustment drivetrain 500.

By virtue of the solutions described, it is possible to configure the device 200 for selecting functions in four separate configurations with a single interface element 1 that is, for example, in the form of a control stem that can be positioned in three stable axial positions. In the variant of the first embodiment of a timepiece 1000 illustrated in FIGS. 1 to 14, this single interface element is in the form of a control stem 1. This stem is able to be actuated in rotation about and in translation along an axis A1. The movement in translation of this control stem 1 makes it possible to reach three stable axial positions, namely a first end position P1, a second, intermediate position P2 and a third and final end position P3.

Within a mechanism provided with a conventional control stem, each axial position of the stem makes it possible to set a device for selecting functions, in particular a setting lever, in a given configuration. The device 200 for selecting functions that is the subject of this document has the specific feature of comprising a number of configurations greater than the number of axial positions of the control stem. This is made possible, for example, by the fact that such a selection device 200 has the specific feature of comprising a setting lever device 150 provided with two setting levers or levers, and that it is able to be indexed in position either by a first indexing device 4 or by a second indexing device 5. More particularly, the different configurations of the selection device are determined by the synergy of the two setting levers or levers, and the axial positions of the stem 1 are determined by one or the other of the two indexing devices. As described below, this means that, in the same embodiment of a selecting device, the interface element 1 is, in some configurations of the selecting device, indexed in position by the first indexing device and, in other configurations of the selecting device, indexed in position by the second indexing device. That is, in some configurations of the selecting device, a stable position of the interface element 1 is determined by the first indexing device, and in other configurations of the selecting device, another stable position of the interface element 1 is determined by the second indexing device.

More particularly, the device 200 for selecting timepiece functions comprises mainly:

a setting lever device 150, and a frame 100.

The setting lever device 150 comprises a lever 2, in particular a first setting lever 2, mounted movably on the frame 100 and a lever 3, in particular a second setting lever 3, mounted movably on the lever 2 or on the frame 100. The selection device 200 also comprises:

the first position indexing device 4 arranged so as to act on the lever 2, and the second position indexing device 5 arranged so as to act on the lever 3.

Alternatively or in addition, the device 200 for selecting timepiece functions may comprise the interface element 1, in particular the control stem 1, and the setting lever device 150 may be arranged so as to define:

n stable positions of the interface element 1, where n≥3, and m selection configurations of the selection device 200, where m≥n+1.

In the first embodiment of the timepiece 1000, the lever 2 is akin to a first setting lever 2, and the lever 3 is akin to a second setting lever 3.

The first setting lever 2 is mounted so as to pivot about an axis A2 relative to the frame 100. Preferably, the second setting lever 3 is mounted so as to pivot about this same axis A2 relative to the frame 100. The axis A2 is for example perpendicular to a main plane P on which the frame 100 of the movement mainly extends.

Figure 3:
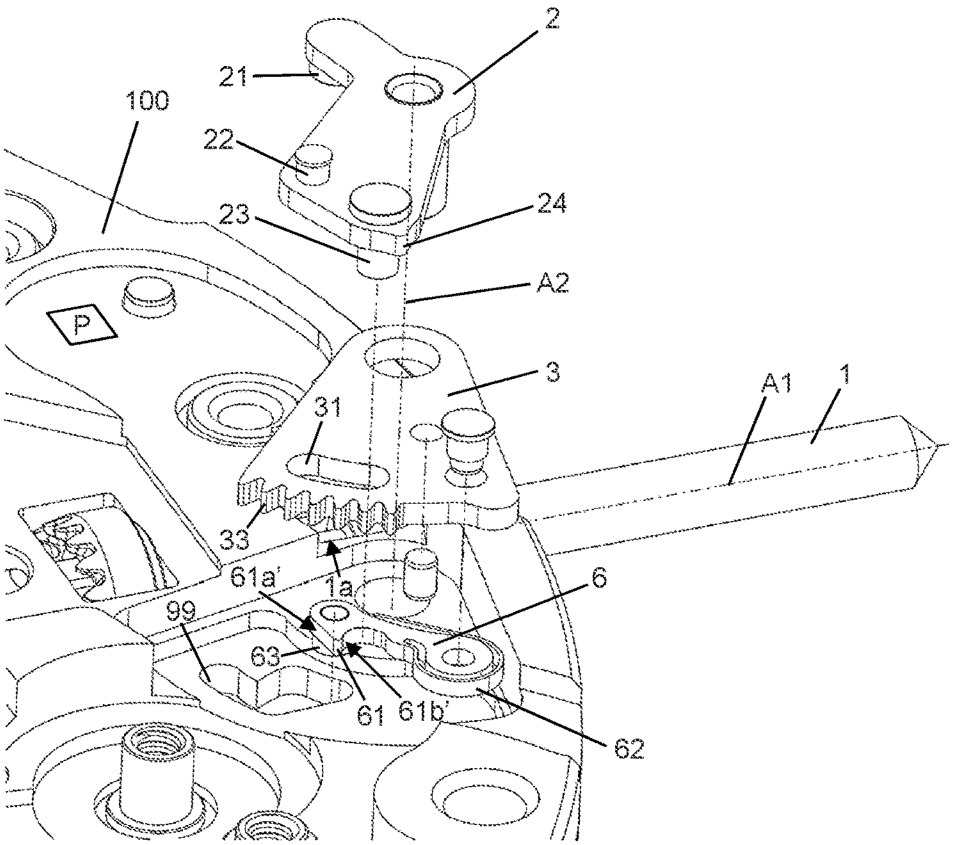
FIGS. 3 to 14 are detail illustrations of the first embodiment of the timepiece.

It is possible to select the different functions of the timepiece mechanism 800 by virtue of the first setting lever 2 and the second setting lever 3, which are more particularly visible in FIG. 3, and the selection device 200 may be set respectively in four separate configurations C1, C2, C3 and C4 defined by three axial positions P1, P2 and P3 of the interface element 1.

In order to pass from one position to another, the interface element 1, in particular the control stem 1, can be pulled along the axis A1, perpendicular to the axis A2, in a first direction D1 known as the "traction" direction, and pushed or pressed along this same axis A1 in a second direction D2 known as the "compression" direction.

The rotation of the first setting lever 2 is directly controlled by the movement in translation of the interface element 1. To this end, the first setting lever 2 comprises a first stud 21, which is housed within a first groove 1*a* of the interface element 1. The elements 1*a* and 21 thus form an articulation connecting the interface element 1 and the first setting lever 2.

The angular position of the setting lever 2 is defined by the first position indexing device 4. This first indexing device 4 preferably comprises a first spring 41 provided with a first functional surface 42 (forming in particular a double beak), and a second setting lever stud 22, arranged on the first setting lever 2 as shown in particular in FIG. 6. The cooperation of the first functional surface 42 with the second stud 22 makes it possible to define angular indexing positions of the setting lever 2. In particular, this cooperation makes it possible to define two stable angular positions of the first setting lever 2, and a third, unstable position of the first setting lever 2. By extension, this cooperation also makes it possible to define two stable axial positions of the interface element 1, and a third, unstable axial position of the interface element 1.

Figure 4:
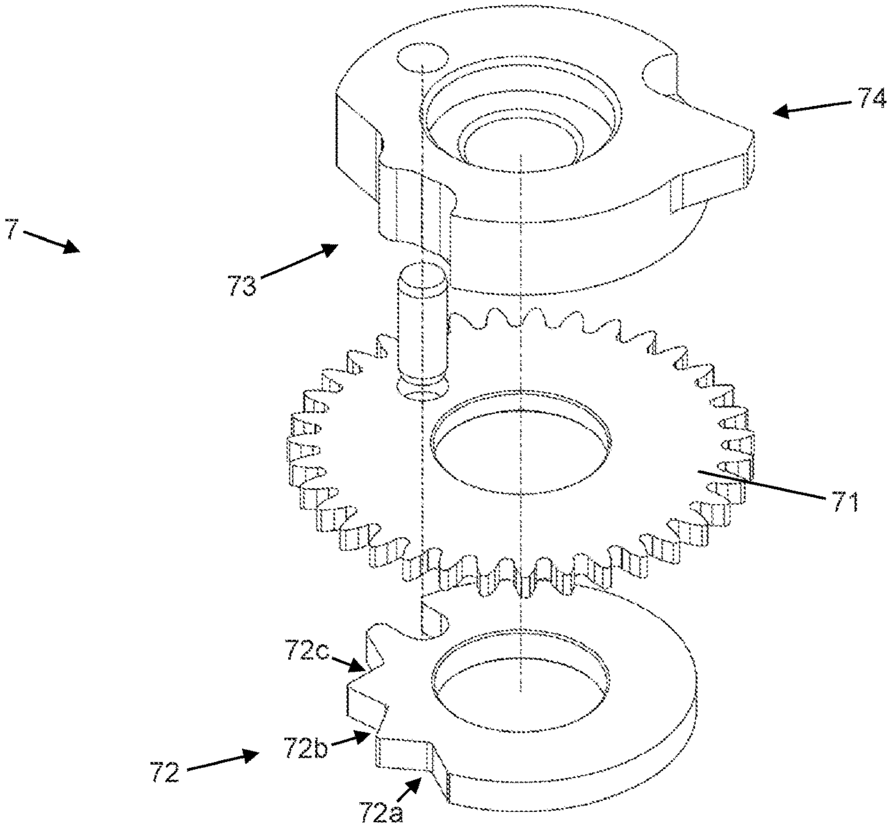
Figure 5:
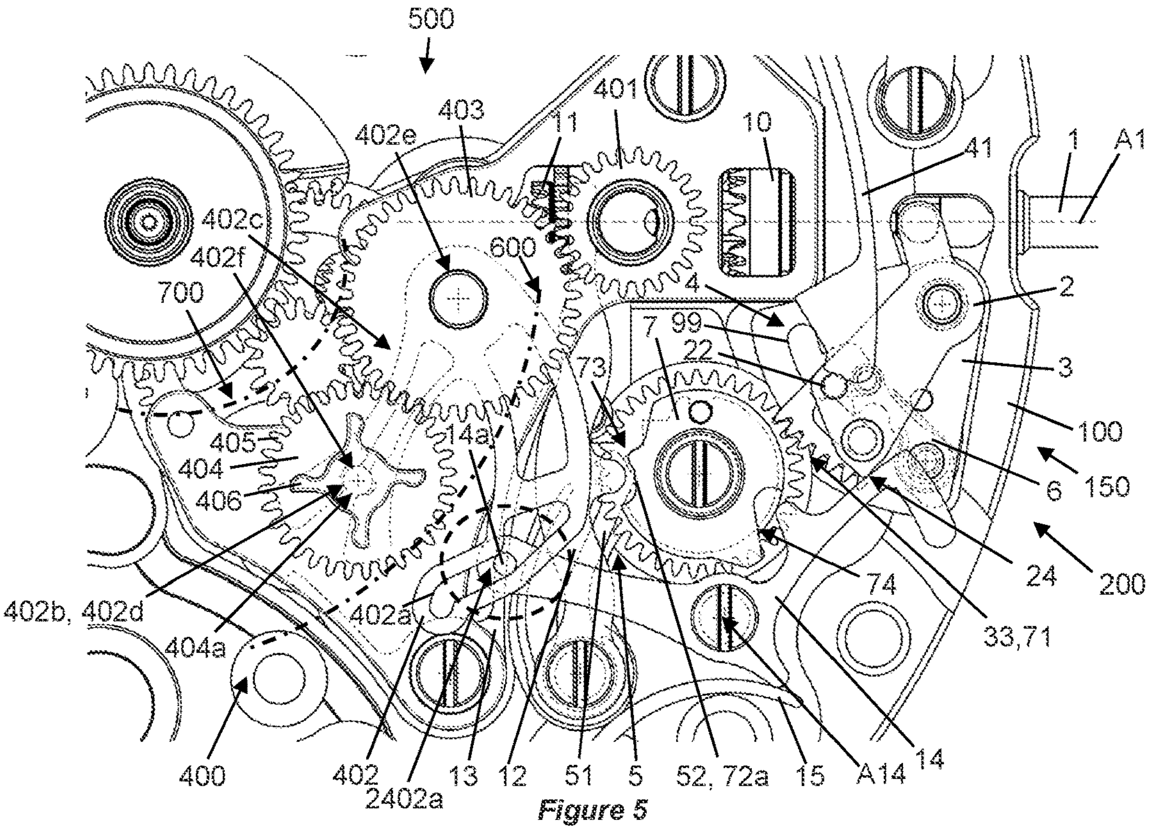

The second setting lever 3 is, for its part, connected to a control mobile 7 via a meshing engagement 33, 71. To this end, the second setting lever 3 comprises a fourth toothset 33 meshing with a fifth toothset 71 of the control mobile 7. The angular position of the second setting lever 3 is ensured by the second indexing device 5. The latter comprises preferably a second spring 51 provided with a second functional surface 52 (forming for example a beak), and the control mobile 7 provided with a third functional surface 72 (forming for example teeth of a star, as illustrated in FIGS. 4 and 5). More particularly, the cooperation of the second functional surface 52 with the third functional surface 72 makes it possible to define three stable angular positions of the second setting lever 3. Furthermore, in a given configuration of the selection device 200, the second setting lever 3 also contributes to the stable axial positioning of the interface element 1.

The control mobile 7 is advantageously pivoted on the frame 100, in particular pivoted perpendicularly to the plane P of the frame 100.

On passing from a given first stable position to a given second stable position of the interface element 1, the first setting lever 2 may drive the second setting lever 3 by virtue of a third stud 23 of the first setting lever 2, which is able to cooperate with a pawl member 6, pivoted on the second setting lever 3, through an elongate cutout 31 in the second setting lever 3.

This cooperation depends, however, on the prior position of the interface element 1 and on the action to which it is subjected. To this end, a fifth return spring 62 tends to keep the pawl member 6, in particular its beak 61, on the path of the third stud 23, while a cutout 99 formed in the frame 100 makes it possible to control said beak 61 in order that it can lie on the path of the third stud 23 or not. The pawl member 6 is for example a lever provided with a beak. More particularly, the pawl member 6 comprises a fourth stud 63 intended to cooperate with the profile formed by the perimeter of the cutout 99. The respective designs of this profile and of the fourth stud 63 make it possible to control the position of the pawl member 6 depending on the angular position of the second setting lever 3 relative to the frame 100. In other words, depending on the angular position of the second setting lever 3, the pawl member 6, more particularly its beak 61, may or may not lie on the path of the third stud 23.

Furthermore, this third stud 23 of the first setting lever 2 is also able to cooperate with the elongate cutout 31 in the second setting lever 3.

Thus, the selection device 200, in particular the setting lever device 150, comprises a pawl member 6 arranged so as to secure the setting lever 2 and the lever 3 in certain operating configurations. The position of this pawl member 6 is controlled at least partially by the profile formed by the perimeter of the cutout 99 depending on the position of the setting lever 2 and/or of the lever 3. More particularly, the pawl member 6 is able to cooperate with the profile formed by the cutout 99 in the frame 100 such that it is able, in at least one configuration of the device 200 for selecting functions, to lock any relative movement between the first and second setting levers 2, 3.

Ultimately, the relative position of the two setting levers 2 and 3, and their relative position with respect to the frame 100, advantageously make it possible to select four separate configurations allowing the actuation of four different functions of the timepiece movement 900. The sequence of the different positions of the interface element 1 and the configurations of the selection device 200 will be explained in detail below.

Advantageously, the setting lever device 150, the first position indexing device 4 and the second position indexing device 5 are arranged such that a stable position of the interface element 1 is determined:

either by the first position indexing device 4, or by the second position indexing device 5.

Also advantageously, the setting lever device 150 is arranged so as to define at least two separate selection configurations of the selection device 200 for a single stable position P2, or intermediate position, of the interface element 1, in particular a single stable position P2 of the interface element 1 between two stable end positions P1 and P3 of the interface element 1. Preferably, the second and third configurations are selectable as a result of a back-and-forth movement of the interface element 1 from the position P2 of said interface element 1.

These three positions P1, P2 and P3 of the interface element 1 make it possible to configure the device 200 for selecting functions in four separate configurations. These four configurations allow the activation of different trains for winding and adjusting the timepiece mechanism 800 in order to allow the user to be able to actuate the different functions of the timepiece movement 900. In particular:

a first configuration C1 makes it possible to manually wind the watch via a winding drivetrain 300, a second configuration C2 allows the adjustment, in particular the two-way adjustment, of the indication of the date by a first set-up of a first adjustment train 400, a third configuration C3 allows the adjustment, in particular the one-way adjustment, of the indication of the day of the week by a second set-up of the first adjustment train 400, a fourth and final configuration C4 makes it possible to set the movement to the correct time by a second adjustment train 500.

Advantageously, the selection device 200 allows easy and intuitive selection of the different timepiece functions:

the first configuration C1 being defined by the first position P1, which lies between the end position of the interface element 1 achieved by acting in the second direction D2 of actuation of the interface element 1, the second configuration C2 being defined by the second position P2 and being able to be selected only after the interface element 1 has been pulled in the first direction D1 from the first position P1, the third configuration C3 also being defined by the second position P2 of the interface element 1, after the latter has carried out a back-and-forth movement, from the second position P2 and back into the second position P2, being passed transiently through the third position P3 or in the vicinity of the third position P3. In this transient state, the position P3 is unstable. The return movement of the interface element 1 from the third position P3 or the vicinity thereof advantageously makes it possible to distinguish the second and third configurations of the selection device, the fourth configuration C4 being defined, for its part, by the third position P3 of the interface element 1, which lies between the end position of the interface element 1 achieved by acting in the first direction D1 of actuation of the interface element 1. Since it is necessary to select the third configuration C3 first in order to select this final configuration, it cannot be confused with the second configuration C2.

It is apparent that it is therefore possible to distinguish, via the kinematics of the interface element 1, all the configurations of the device 200 for selecting functions.

The first end position P1 of the interface element 1, which is stable and pushed the furthest into the frame 100, makes it possible to define a first configuration C1 of the selection device which makes it possible to manually actuate the winding train of the timepiece movement 900.

The second, intermediate stable position P2 of the interface element 1 makes it possible to define:

a second configuration C2 of the device for selecting functions which makes it possible to actuate a first, one-way or two-way adjustment train for adjusting a function for indicating a first item of time-related information, and a third configuration C3 of the device for selecting functions which makes it possible to actuate a second, one-way or two-way adjustment train for adjusting a function for indicating a second item of time-related information.

For example, the first adjustment train is an adjustment train (in particular a two-way adjustment train) for adjusting an indication of the date and the second adjustment train is an adjustment train (in particular a one-way adjustment train) for adjusting an indication of the day.

For example again, the first adjustment train could be an adjustment train (in particular a two-way adjustment train) for adjusting an indication of a time zone and the second adjustment train could be an adjustment train (in particular a one-way adjustment train) for adjusting an indication of the date.

Lastly, the third end position P3 of the interface element 1, which is stable and pulled the furthest out of the frame 100, makes it possible to define a fourth configuration C4 of the selection device which makes it possible to actuate an adjustment train for adjusting the time.

The mechanism 800 is explained in detail below by way of the variant of the first embodiment of the timepiece 1000 illustrated in FIGS. 1 to 14.

Figure 2:
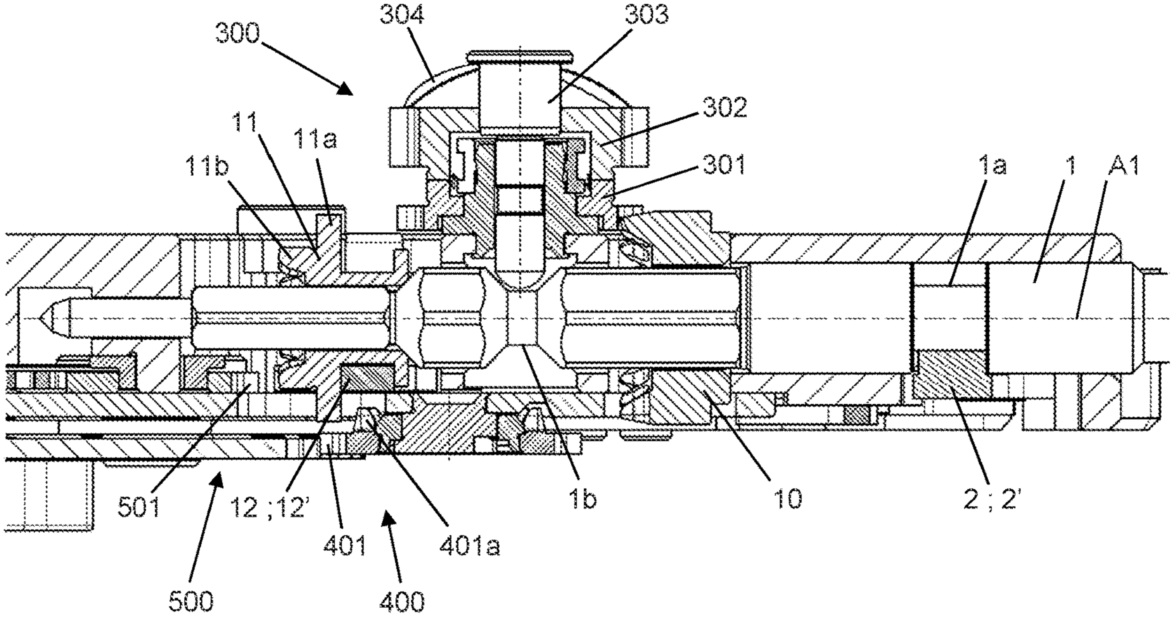
FIG. 2 is a view in section on a longitudinal plane passing through an axis A1 of a stem, shown in FIG. 1.

FIG. 2 illustrates a part of the winding drivetrain 300 made operational by virtue of the first configuration C1 of the device 200 for selecting functions, when the control stem 1 is in the first position P1. This winding drivetrain 300 in this case comprises a vertical clutch device comprising a first crown wheel 301 that meshes with a winding mechanism pinion 10 mounted squarely on the control stem 1. This first crown wheel 301 is also able to mesh with a second crown wheel 302 depending on the state of the vertical clutch device, controlled by the axial position of the control stem 1 along the axis A1. A sliding axis 303, secured to the second crown wheel 302, is located at the bottom of a second groove 1*b* in the control stem 1 by virtue of the pressure of a return spring 304. The first crown wheel 301 and the second crown wheel 302 are then engaged with one another, thereby allowing the movement to be wound manually. When the control stem 1 is in the other positions P2 and P3, the sliding axis 303 is outside the second groove 1*b*, thereby disengaging the second crown wheel 302 from the first crown wheel 301. Such a vertical clutch device is described for example in the document WO2012175595.

The first adjustment train 400 is able to be engaged by a first toothset 11*a* of a sliding pinion 11 mounted squarely on the control stem 1. More specifically, when the control stem 1 is in the second position P2, the sliding pinion 11 is positioned by a lever 12 pivoted on the frame 100 and controlled by the control mobile 7 such that the toothset 11*a* of the sliding pinion 11 can mesh with a third, frontal toothset 401*a* of a first pinion 401 of the first adjustment train 400. This first pinion is provided to drive a correcting mobile 404 via a mobile 403. This correcting mobile 404 has the particular feature of being pivoted on a lever 402 controlled by a lever 14 of the timepiece mechanism 800. The correcting mobile 404 is rotatable around an axis that is fixed relative to the lever 402.

As illustrated in particular in FIG. 4, the control mobile 7, which includes a control cam, comprises a third profile 73 and a fourth profile 74 that are able to cooperate respectively with the levers 12, 14. A return spring 13 and a return spring 15 tend, respectively, to return these levers 12, 14 toward these third and fourth profiles 73, 74 of the control mobile 7 with which they are able to cooperate.

When the device 200 is configured in the second configuration C2 or in the third configuration C3, the third profile 73 of the mobile 7 makes it possible to release the lever 12 under the effect of the spring 13, in order to allow the sliding pinion 11 to mesh with the first adjustment train 400.

When the device 200 is configured in the second configuration C2 or in the third configuration C3, the fourth profile 74 of the mobile 7 makes it possible to control the lever 14 in cooperation with the spring 15, in order to allow the lever 402 to be positioned. The cooperation of the lever 14 and the lever 402 takes place here in particular via a first pin 14*a* of the lever 14, which cooperates by contact with a cam profile 402*a* of the lever 402.

The timepiece mechanism 800 for correcting one or more timepiece functions thus comprises:

- the correcting mobile 404,
- the lever 14 including a first cam desmodromic connecting element 14*a*, and
- the lever 402.

The lever 402 has the particular feature of comprising:

- at least one first element 402*d* for guiding the correcting mobile 404,
- at least one first friction element 402*b* in contact with the correcting mobile 404,
- a second cam desmodromic connecting element 402*a* provided to cooperate by contact with the first cam desmodromic connecting element 14*a*.

The lever 402 is in particular pivoted relative to the frame 100 on a axis 402*e* or an element 402*e* for guiding in rotation. The lever preferably comprises two legs connected together at the element 402*e* for guiding in rotation:

- a first leg having, at one end, the element 402*e* for guiding in rotation and, at the other end, the at least one first element 402*d* for guiding the correcting mobile 404 and the at least one first friction element 402*b* in contact with the correcting mobile 404,
- a second leg having, at one end, the element 402*e* for guiding in rotation and, at the other end, the second cam desmodromic connecting element 402*a*.

Via the action of the cam desmodromic connection, the position of the lever 14 determines the position or the configuration of the lever 402.

Thus, the lever 14 and the lever 402 are configured and/or arranged so as to position the lever 402 in a first angular position and a second angular position about its axis 402*e*, the first angular position making it possible to activate a first corrective function, in particular a corrective function for the indication of the date, and the second angular position making it possible to deactivate the first corrective function.

Advantageously, the lever 14 and the lever 402 are configured and/or arranged so as to position the lever 402 in a third angular position about its axis 402*e*, making it possible to activate a second corrective function, in particular a corrective function for the indication of the day.

Preferably, the lever 14 and the lever 402 are configured and/or arranged such that, in the second angular position, the second corrective function is deactivated.

In the variant shown in FIGS. 1 to 14 of the first embodiment, the first cam desmodromic connecting element is a stud 14*a* or a pin and the second cam desmodromic connecting element is a cam profile 402*a*. Alternatively, in another variant, the first cam desmodromic connecting element could be a cam profile and the second cam desmodromic connecting element could be a stud or a pin.

Figure 7:
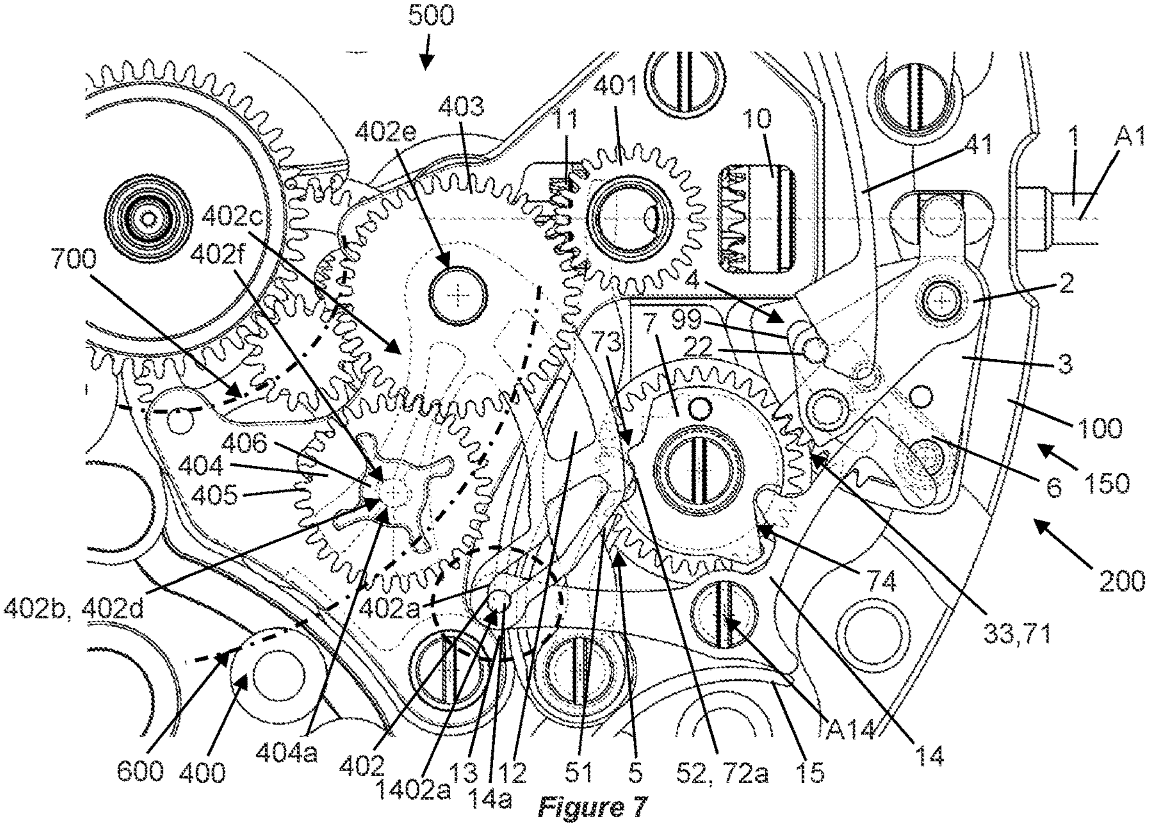
Figure 9:
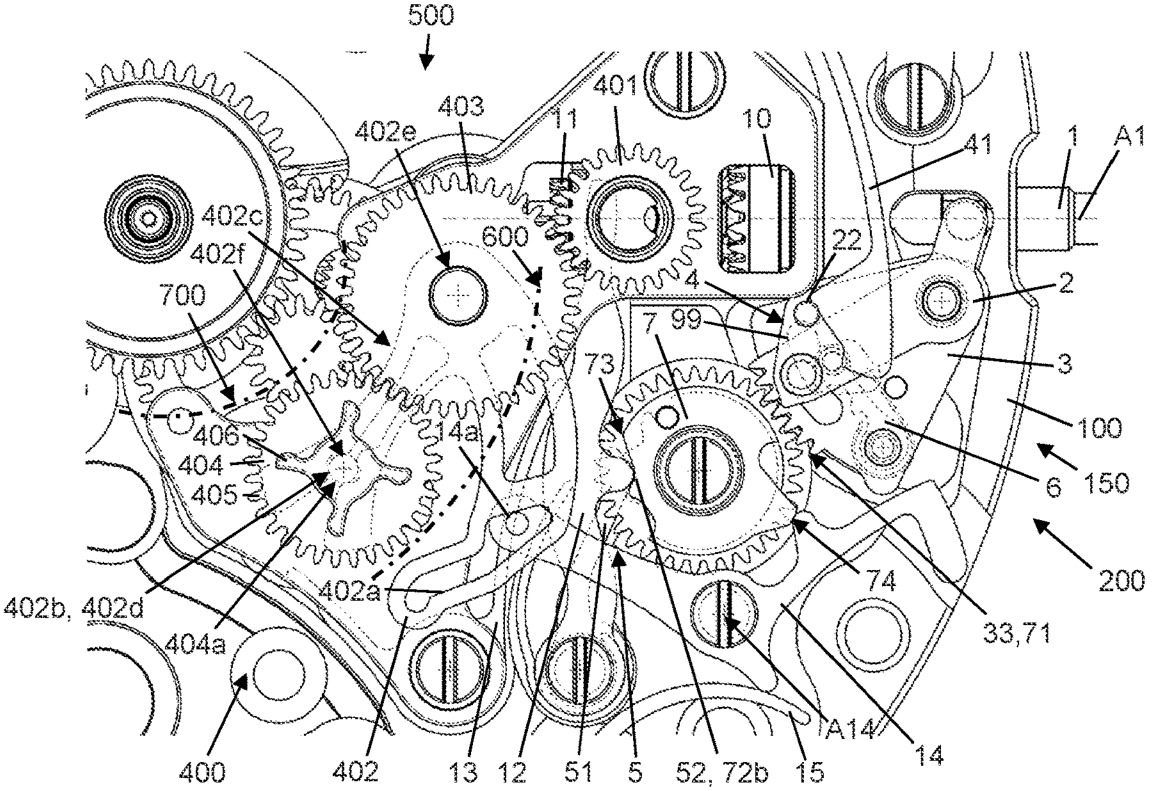
Figure 11:
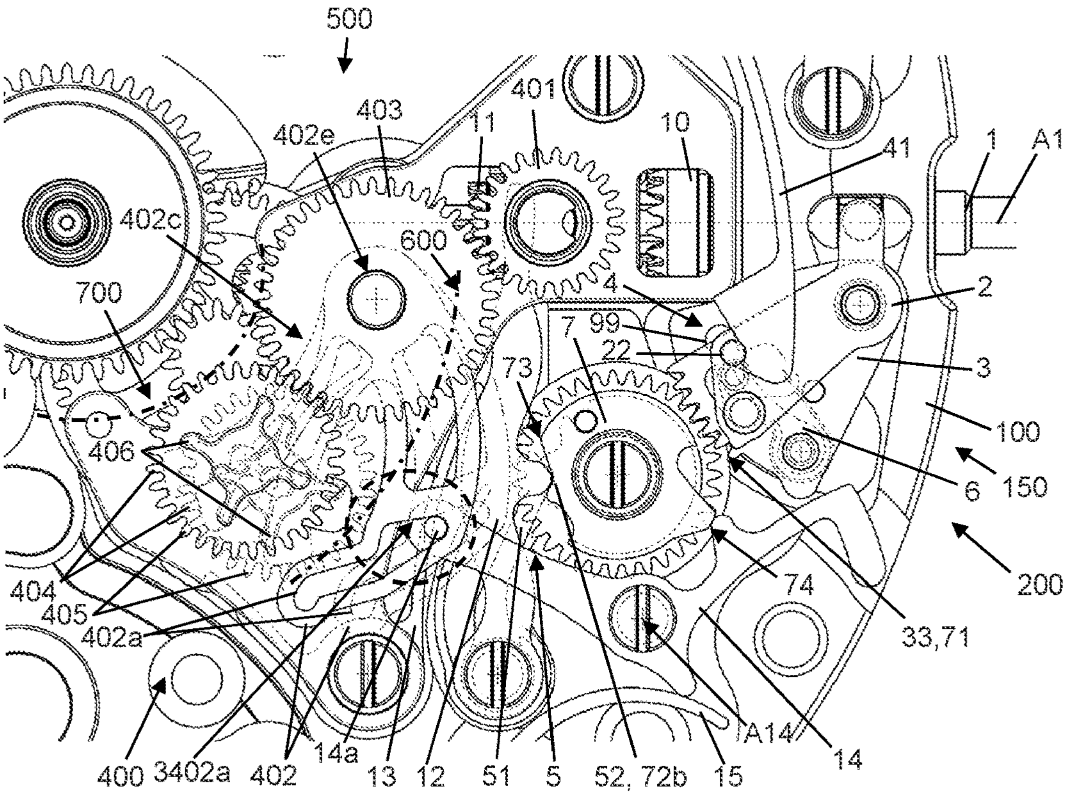
Figure 13:
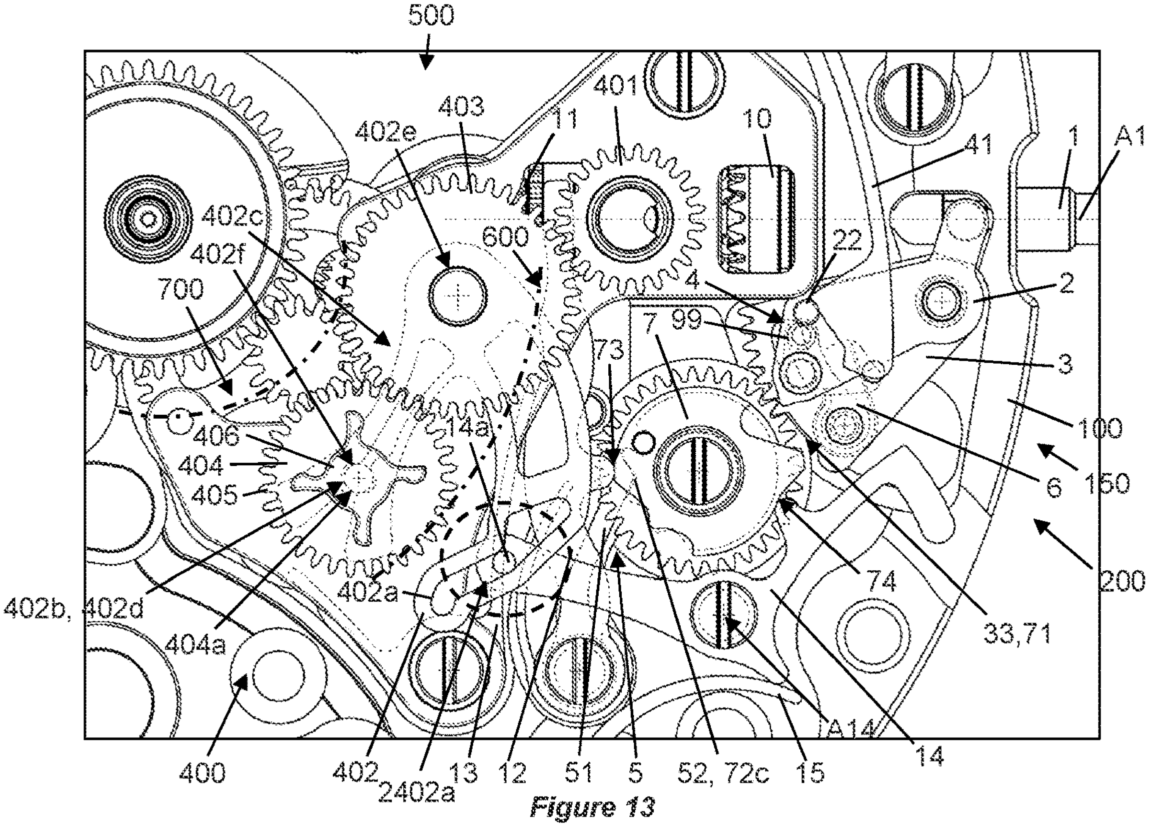

In particular, the correcting mobile 404 comprises a corrector 406 for the indication of the date, and a gearwheel 405 that rotates as one with the corrector 406. The cooperation of the elements 14 and 74 makes it possible to position the corrector 406 of the correcting mobile 404 in the toothset of a date disk 600 (as shown in FIG. 7) or to position the gearwheel 405 of the correcting mobile 404 in the toothset of a star 700 for displaying the day (as shown in FIG. 11) or to disengage the correcting mobile 404 from any adjustment function (as shown in FIGS. 5, 9 and 13).

Preferably, the lever 402 comprises at least one arm 402*c* and the first friction element 402*b* comprises at least one friction surface 402*f*, the at least one arm 402*c* being arranged so as to elastically return the at least one friction surface 402*f* against the correcting mobile 404.

In the particular variant of the lever 402 illustrated in particular in FIG. 5, said lever 402 is more specifically provided with the two elastically deformable arms 402*c*, each comprising two bearing surfaces 402*f* that cooperate by contact with the portion 404*a* of the correcting mobile that is preferably in the form of a cylinder. In this particular variant of the lever 402, the friction element 402*b* is thus employed via two elastically deformable arms that each comprise two bearing surfaces 402*f* that cooperate by contact with the portion 404*a* of the correcting mobile. Thus set up, the friction element 402*b* applies at least one radial or substantially radial force (give or take the effects of the coefficient of friction) to the portion 404*a* of the correcting mobile.

In this particular variant of the lever 402, the four bearing surfaces 402*f* define a housing for fitting the portion 404*a* of the correcting mobile within the lever 402. Preferably, the bearing surfaces 402*f* are distributed evenly around the portion 404*a* of the correcting mobile 404, meaning that the angular interval between any two adjacent bearing surfaces is identical or more or less identical.

In this particular variant of the lever 402, the element 402*d* for guiding the correcting mobile 404 in rotation is implemented by the bearing surfaces 402*f* that cooperate by contact with the portion 404*a* of the correcting mobile. In this particular case, the element 402*d* for guiding the correcting mobile 404 in rotation and the friction element 402*b* are thus coincident or formed by one and the same element.

Preferably, the lever 402 is in one piece. The lever 402 may for example be obtained by being cut out of a plate or by electroforming techniques such as LIGA.

Advantageously, the lever 402 may comprise a single level, meaning that its functions:

of guiding the correcting mobile in rotation and of controlling its position by contact with the lever 14 are ensured at a single level or on a single plane constituting a main plane of the lever on which the lever mainly extends, or have a common plane.

Consequently, the thickness of the lever 402 or the space requirement in terms of thickness of the lever can be reduced. The thickness or the space requirement in terms of thickness may be less than 200 μm or less than 150 μm.

The friction torque brought about by the friction element 402*b* acting on the portion 404*a* of the correcting mobile allows the lever 402 and its correcting mobile to pivot about the element 402*e* for guiding the lever 402 in rotation, specifically depending on the direction of rotation of the adjustment train 400. Thus, each reversal of the direction of rotation applied to the adjustment train is able to bring about rotation of the lever 402 under the effect of the rotation of the correcting mobile.

This lever 402 has in this case the particular feature of comprising the profile 402*a*, in the form of a groove, which is provided to cooperate with the stud 14*a* of the lever 14. Advantageously, the groove 402*a* is provided with three separate portions 1402*a*, 2402*a*, 3402*a*. The cooperation between the elements 14*a* and 402*a* makes it possible to define at least three angular positions of the lever 402 about the guiding element 402*e*.

More particularly, when the device 200 for selecting functions is in the second configuration C2, the stud 14*a* makes it possible to lock the angular position of the lever 402 such that the correcting mobile 404 can carry out two-way adjustment of the indication of the date (as can be seen in FIG. 7). In this second configuration, the stud 14*a* of the lever 14 is located in the first portion 1402*a* of the groove 402*a*. This first portion comprises two parallel or substantially parallel flanks disposed on either side of the stud 14*a*, which prevent any accidental rotation of the lever 402 about its axis 402*e*, allowing for play between the stud and the flanks, the distance between the two flanks corresponding to the diameter of the stud, allowing for play. Each of these flanks forms an angle of around 90° with regard to a segment defined by a first point passing through the pivot axis A14 of the lever 14 and a second point passing through the center of the stud 14*a*. In other words, the flanks are disposed orthoradially or substantially orthoradially with regard to the axis A14. Each of these flanks thus forms a non-zero angle (for example more or less) 90° with the direction orthoradial to the axis 402*e*. Such a design prevents any accidental rotation of the lever 402 about the axis 402*e* under the effect of the elements 402*b*, 402*c*, 402*d* potentially actuated by rotation of the mobiles 401, 403, 404 about their respective axis. In this second configuration C2, the lever 14, under the effect of its return spring 15, is positioned in a recess formed within the profile 74 of the control mobile 7 connected to the second setting lever 3.

When the device 200 for selecting functions is in the third configuration C3, the stud 14*a* makes it possible to position the lever 402 while allowing it to have a degree of freedom in rotation so as to allow the correcting mobile 404 to carry out one-way adjustment of the indication of the day (as can be seen in FIG. 11). In this third configuration C3, the stud 14*a* is disposed within a third portion 3402*a* of the groove 402*a*. This third portion 3402*a* comprises flanks that are shaped and oriented such that they allow the lever 402 to rotate about the axis 402*e* through a given angular range, such that it is able to reach an angular position allowing the wheel 405 to mesh with the wheel 700 for indicating the day under the effect of the elements 402*b*, 402*c*, 402*d* potentially actuated by rotation of the mobiles 401, 403, 404 about their respective axes. More particularly, the distance between two flanks of the third portion 3402*a*, in a direction orthoradial to the axis 402*e*, is greater than the diameter of the stud 14*a*. For example, this distance is around three times the diameter of the stud 14*a*.

In the other configurations C1 and C4, the position of the lever 402, still defined by the stud 14*a*, is such that the correcting mobile 404 is out of the range of the indicators of the date or the day (as can be seen in FIGS. 5 and 13). In these configurations C1 and C4, the stud 14*a* of the lever 14 is located in the second portion 2402*a* of the groove 402*a*. This second portion comprises two parallel or substantially parallel flanks disposed on either side of the stud 14*a*, which prevent any accidental rotation of the lever 402 about its axis 402*e*, allowing for play between the stud and the flanks, the distance between the two flanks corresponding to the diameter of the stud, allowing for play. Each of these flanks forms an angle of around 45° with regard to a segment defined by a first point passing through the axis A14 and a second point passing through the center of the stud 14*a*. Each of these flanks also forms a non-zero angle with the direction orthoradial to the axis 402*e*.

In the first configuration C1, the lever 14 has the particular feature of being held in position counter to its return spring 15 by the setting lever 2, in particular by the profile 24 of the setting lever 2, the latter being positioned by the control stem 1, itself positioned in the first axial position P1.

In the fourth configuration C4, the lever 14 is positioned counter to its spring 15 by the profile 74 of the mobile 7, the latter being positioned by the control stem 1, itself positioned in the third axial position P3. In this fourth configuration, the second adjustment train 500 makes it possible to set the movement to the correct time. More particularly, the device 200 for selecting functions sets the timepiece mechanism 800 such that a second frontal toothset 11*b* of the sliding pinion 11 meshes with a second pinion 501 of the second train 500, thereby allowing the user to be able to set the movement to the correct time. More particularly, in this configuration, the profile 73 of the mobile 7 makes it possible to position the lever 12 such that a second frontal toothset 11*b* of the sliding pinion 11 meshes with a second pinion 501 of the second train 500, thereby allowing the user to be able to set the movement to the correct time.

The sequence of the different positions of the interface element 1, in particular of the control stem 1, and of the configurations of the selection device 200 is set out in detail below on the basis of the variant of the first embodiment of the timepiece 1000 illustrated in FIGS. 1 to 14.

Figure 6:
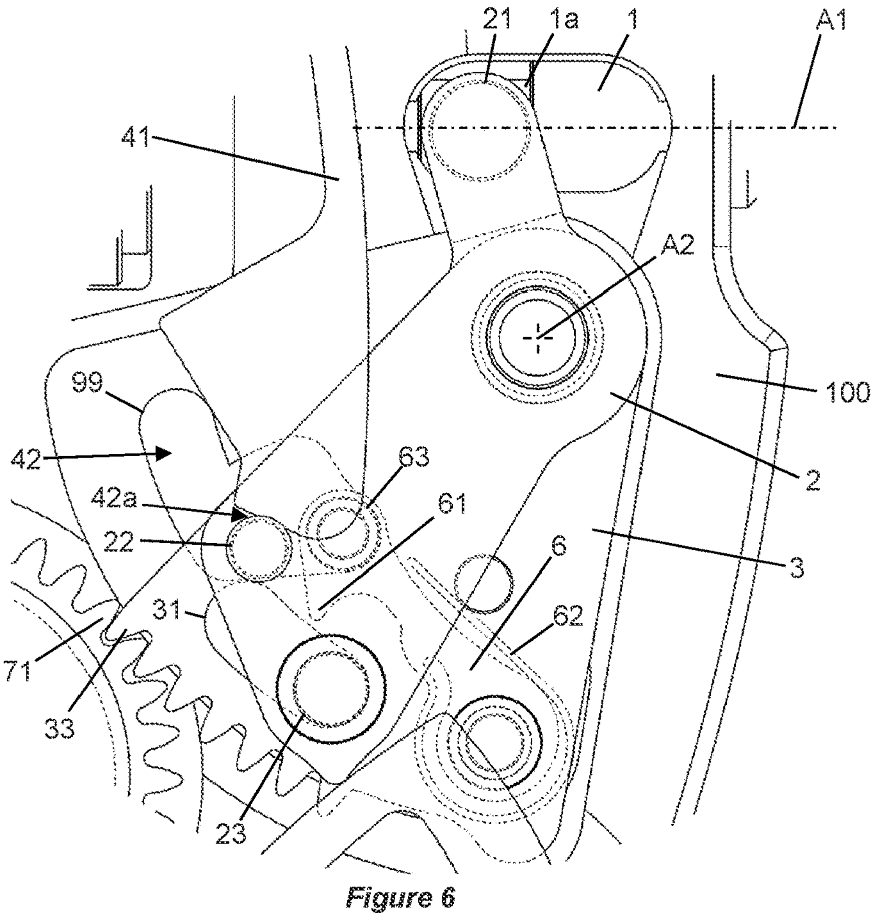

The first configuration C1 of the device 200 for selecting functions, illustrated in FIGS. 5 and 6, defines the configuration for winding the movement 900. The control stem 1 is in the first position P1, thereby activating or making operational the winding drivetrain 300, and it is held in this position by the first indexing device 4. More particularly, the second stud 22 of the first setting lever 2 is held in position by the first flank 42*a* of the first functional surface 42 of the first spring 41.

For its part, the second setting lever 3 is held in position by the second indexing device 5. More particularly, it is held in position by the second functional surface 52 which cooperates in this case with a first indexing notch 72*a* in the third functional surface 72 of the mobile 7.

In this first configuration, the pawl member 6 is removed from the path of the third stud 23. More particularly, the respective shapes of the fourth stud 63 and of the profile of the cutout 99 in the frame 100 make it possible to keep the beak 61 out of the range of the third stud 23.

In this first configuration, the levers 12 and 14, on account of the arrangement of the control stem 1 and of the first setting lever 2, are in this case out of the range of the third and fourth profiles 73, 74 of the control mobile 7.

More particularly, the sliding pinion 11 is in this case returned by the lever 12 against a bearing surface of the control stem 1 such that it is disengaged from any adjustment train, while the lever 14 is held in position by the first setting lever 2 via a second profile 24. In this configuration, the lever 402 is positioned by the lever 14 such that the correcting mobile 404 is out of the range of the date disk and the star for displaying the day.

Figure 8:
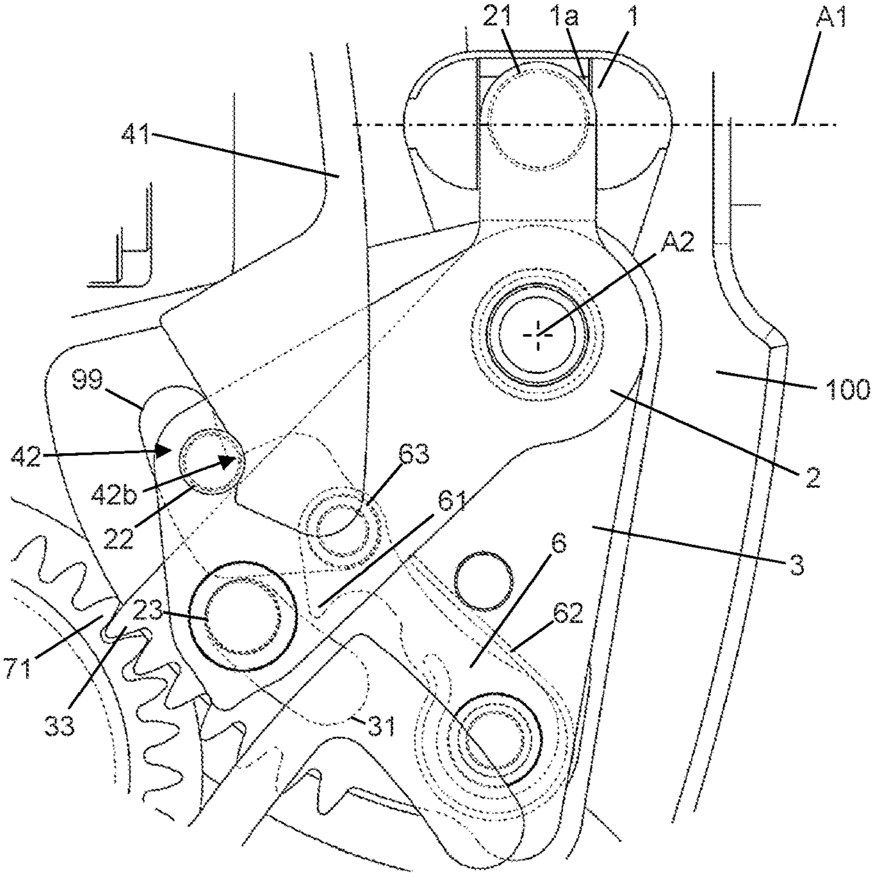

Passage from the first configuration C1 to the second configuration C2:

To configure the device 200 for selecting functions in the second configuration C2 illustrated in FIGS. 7 and 8, it is necessary to pull the control stem 1 in the first direction D1, from the first position P1 to the second position P2. During this action, the third stud 23 of the first setting lever 2 passes freely along the elongate cutout 31 in the second setting lever 3 without driving the latter. The control stem 1 and the first setting lever 2 are then indexed by a recess formed in a second flank 42*b* of the first spring 41 cooperating with the second stud 22 of the first setting lever 2. In this second configuration C2, the position of the second setting lever 3 remains unchanged compared with the first configuration C1.

The control mobile 7 and the pawl member 6 have remained stationary, and the latter remains out of the range of the path of the third stud 23.

The axial movement of the control stem 1 in the first direction D1 causes the disengagement of the winding drivetrain 300, and the engagement of the first adjustment train 400. The movement of the lever 12, under the effect of the spring 13, is possible here since the third profile 73 is in this case designed to allow it to have this degree of freedom.

In this configuration, the lever 14 is no longer retained by the second profile 24 of the first setting lever 2, allowing it to position the lever 402 in a stable angular position about the axis 402*e*, which is characterized by the fact that the corrector 406 is disposed in the toothset of the date disk 600, in particular at its pitch diameter. As for the lever 12, the movement of the lever 14 is possible in this case since the profile 74 is designed to allow it to have this degree of freedom.

More particularly, in this second configuration, the toothset 11*a* of the sliding pinion 11 meshes with the frontal toothset 401*a* of the pinion 401 of the first adjustment train 400. This first pinion drives the correcting mobile 404 by way of the mobile 403 pivoted about the axis 402*e*.

Passage from the Second Configuration C2 to the Third Configuration C3:

On pulling on the control stem 1 once again, the latter temporarily reaches the third position P3 before returning to the second position P2, under the effect of the first spring 41, after the control stem 1 is released by the user.

Figure 10:
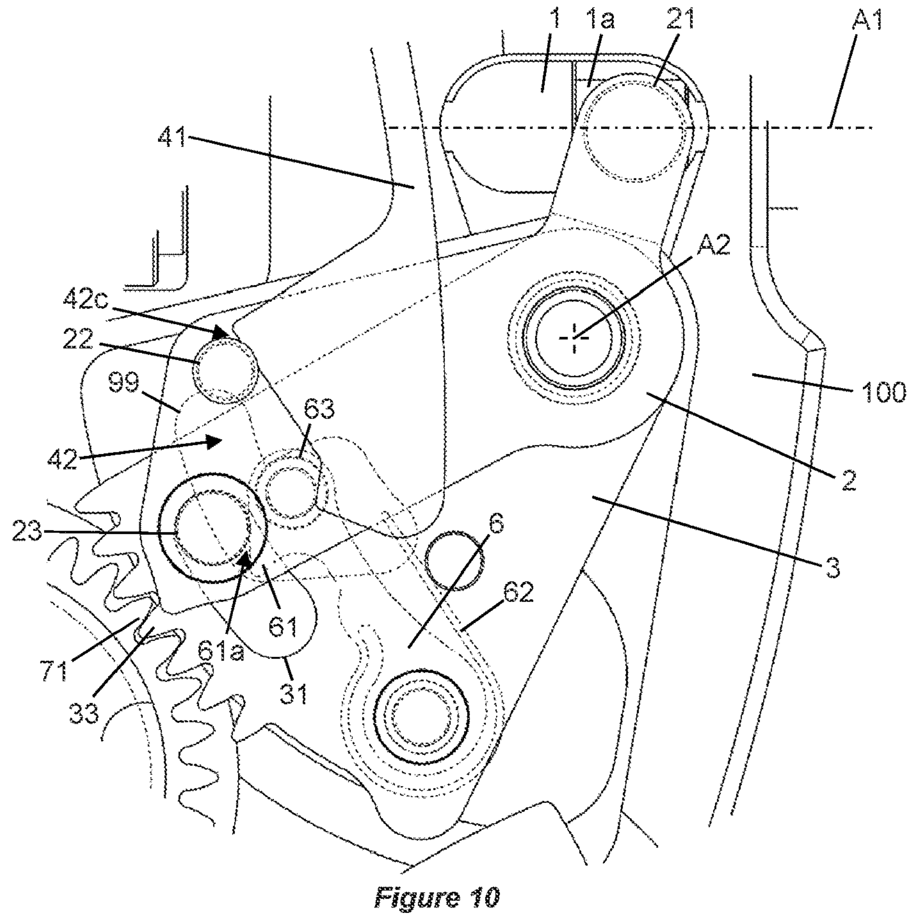

The transient, unstable state in which the control stem 1 is located temporarily in the third position P3 is illustrated in FIGS. 9 and 10. This unstable position of the control stem 1 makes it possible to configure the device 200 for selecting functions so as to allow the one-way adjustment of the indication of the day.

During the action of pulling the control stem 1 toward the third position P3, the first setting lever 2 drives the second setting lever 3, which then drives the control mobile 7. This is made possible by virtue of the third stud 23 of the first setting lever 2, which presses against a first end of the elongate cutout 31 in the second setting lever 3, the latter already being disposed at this first end in the second configuration C2.

At the end of its rotational movement, the second setting lever 3 is held in its new position by virtue of the second indexing device 5. More particularly, the second setting lever 3 is held in its new position by the second functional surface 52 cooperating here with a second indexing notch 72*b* in the third functional surface 72 of the mobile 7, the latter being connected to the second setting lever 3 via the meshing connection 33, 71.

Thus, while the control stem 1 is in an unstable position, the second setting lever 3 is, for its part, in a stable position defined by the second indexing device 5.

In this new stable position of the second setting lever 3, the profile of the cutout 99 formed in the frame 100 makes it possible to release the pawl member 6. Thus, under the effect of the fifth return spring 62, the pawl member 6 lies on the path of the third stud 23. More specifically, a fourth flank 61*a* of the beak 61 is now in contact with the third stud 23.

Figure 12:
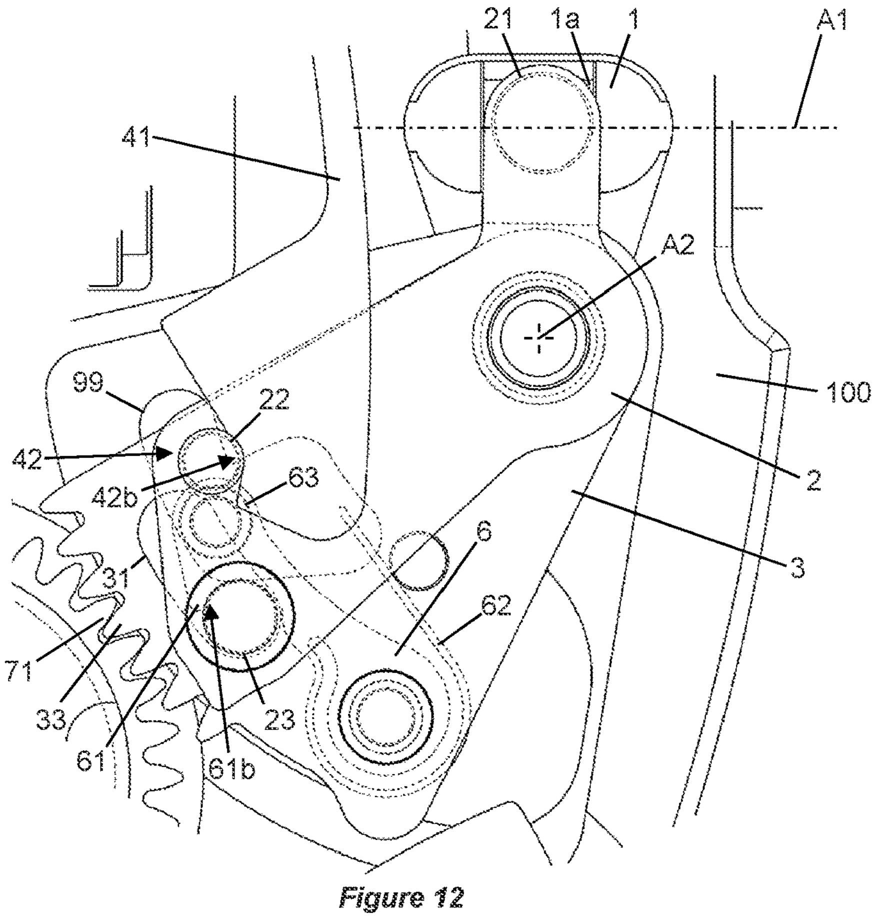

In a similar way to the control stem 1, the first setting lever 2 is also in an unstable position, the position of the latter not being defined by the first indexing device 4. More specifically, the second stud 22 of the first setting lever 2 is situated on a third flank 42*c* of the first spring 41, which tends to return the control stem 1 into the second position P2, in the recess in the second flank 42*b*, after the user has released the control stem 1. After this final action, the device 200 for selecting functions is then configured in the third configuration C3. This configuration is illustrated in FIGS. 11 and 12.

When the control stem 1 returns into the second position P2, the third stud 23 of the first setting lever 2 then pushes back the fourth flank 61*a* of the beak 61 of the pawl member 6. This pawl member 6 can thus move out of the way and allow the third stud 23 to pass to the other side of the beak 61. The stud 23 is then locked between a fifth flank 61*b* of the beak 61 and a second end of the elongate cutout 31. The first and second setting levers are then secured so as to rotate as one. Any relative rotational movement between the first and second setting levers is therefore impossible.

In this third configuration C3, the first and second setting levers are thus indexed in a stable position by the second indexing device 5. By extension, the control stem 1 is also indexed in a stable position by the second indexing device 5.

In this third configuration C3, the lever 12 in this case maintains its position as defined by the second configuration C2, thereby allowing the sliding pinion 11 to remain engaged with the first adjustment train 400.

By contrast, the profile 74 of the control mobile 7 actuates the lever 14 in order that the latter configures the lever 402 so as to allow the adjustment of the day. In particular, this allows the wheel 405 of the correcting mobile 404 to carry out one-way adjustment of the indication of the day by meshing with the toothset of the day wheel 700.

Thus, in this third configuration, the sliding pinion 11, the first pinion 401, the mobile 403 and the correcting mobile 404 remain meshed. Only the position of the lever 14 is modified under the effect of the rotation of the control mobile 7, which is controlled by a back-and-forth movement of the control stem 1 allowing the mechanism to pass from the second configuration C2 to the third configuration C3. More particularly, in this third configuration, the lever 14 is positioned by a protrusion formed at the profile 74 of the control mobile 7.

Figure 14:
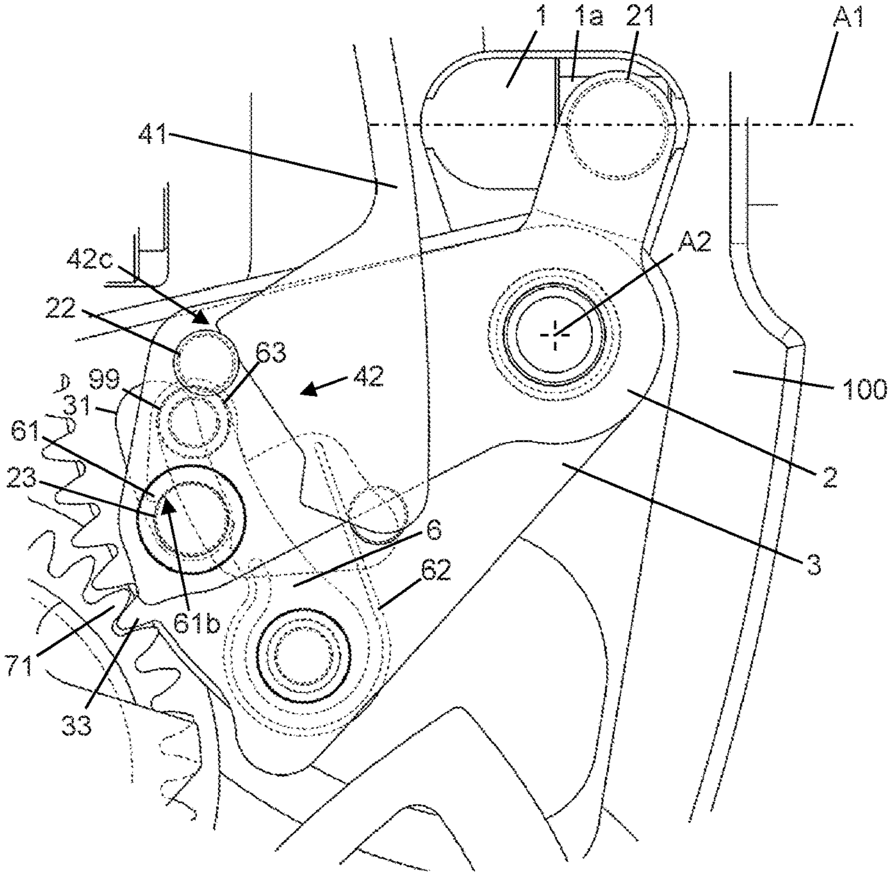
Figure 15:
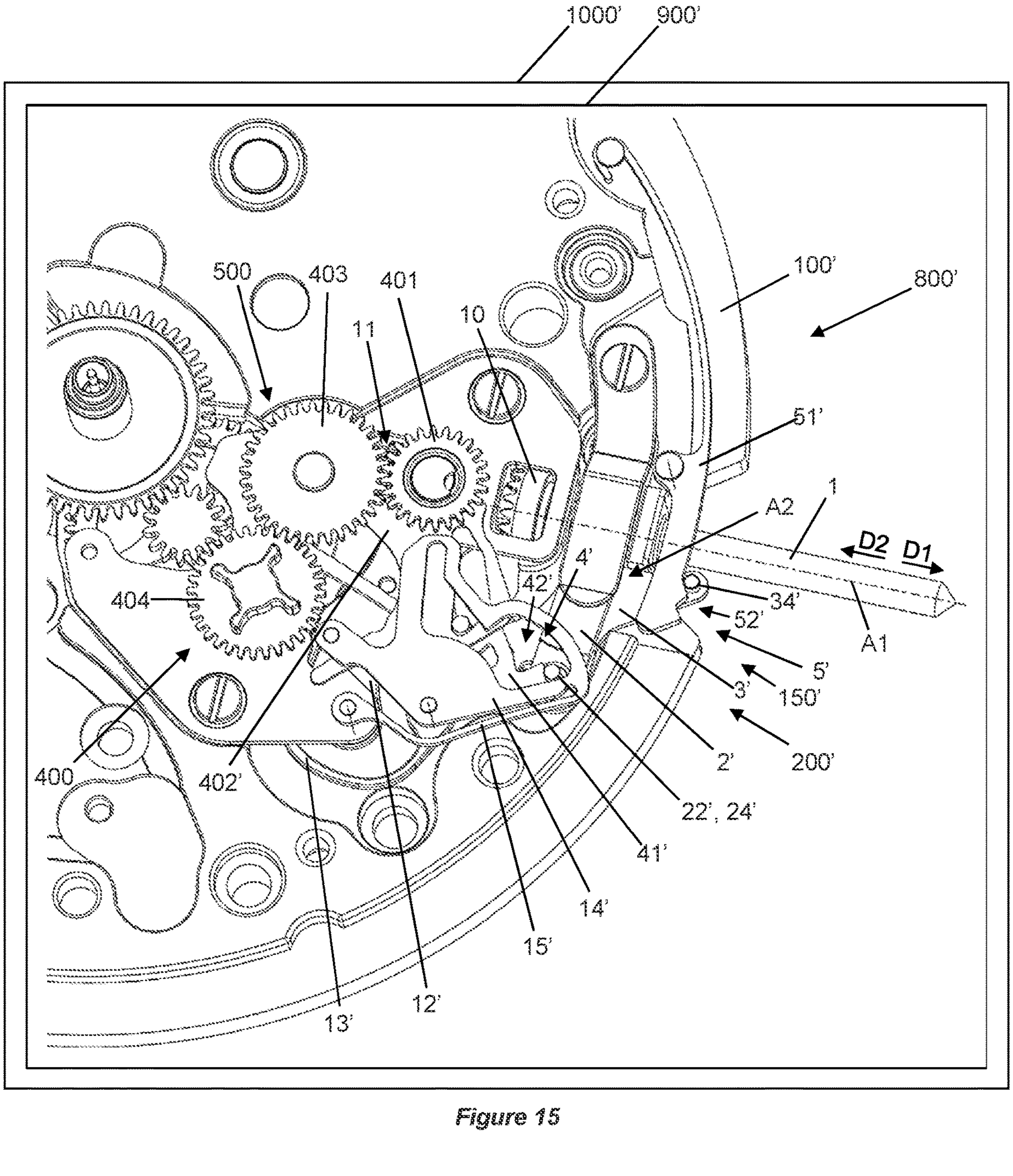
FIG. 15 is a schematic view of a second embodiment of a timepiece.

Passage from the Third Configuration C3 to the Fourth Configuration C4:

Renewed traction on the control stem 1 in the first direction D1 allows the control stem 1 to reach the third stable position P3, and defines the device 200 for selecting functions in the fourth configuration C4. This configuration is illustrated in FIGS. 13 and 14.

During the passage of the control stem 1 from position P2 to position P3, the first setting lever 2 drives with it the second setting lever 3, said setting levers being secured so as to rotate as one via the elements 23, 31 and 6.

The second setting lever 3 is then held in a new stable position by the second indexing device 5. More particularly, the second functional surface 52 cooperates here with a third indexing notch 72*c* in the third functional surface 72 of the mobile 7.

By extension, the first setting lever 2 is also held in a stable position via the second indexing device 5, while the second setting lever stud 22 is still situated on the third flank 42*c* of the first spring 41.

In this fourth configuration, the lever 12 is actuated by the profile 73 in order that the sliding pinion 11 can engage with the second adjustment train 500.

For its part, the lever 14 is actuated by the profile 74 in order that the lever 402 is positioned such that the correcting mobile 404 is out of the range of the toothset of the date disk and of that of the days of the week star.

The user can therefore set the movement to the correct time.

The fourth configuration C4 differs from the first configuration by the fact that the lever 14 is not held in position by the profile 24 of the setting lever 2 but by a profile 74 of the control mobile 7 kinematically connected to the second setting lever 3, the latter being previously positioned by the control stem 1, itself positioned in the third axial position P3 by way of the first setting lever 2.

Passage from the Second Configuration C2 to the First Configuration C1:

From the second configuration C2, by pushing back the control stem 1 in the second direction D2 from the position P2 to the position P1, the first setting lever 2 is reconfigured easily in the first configuration C1. More particularly, the second setting lever stud 22 passes from the second flank 42*b* to the first flank 42*a* of the first spring 41.

The return of the control stem 1 into the position P1 allows the winding drivetrain 300 to once again be engaged. At the same time, the control stem 1 also disengages the sliding pinion 11 from the first adjustment train 400.

In this same action, the first setting lever 2 pushes the lever 14 back, causing the correcting mobile 404, pivoted on the lever 402, to be out of the range of the toothset of the date disk and that of the day star.

Passage from the Third Configuration C3 to the First Configuration C1:

From the third configuration C3, only the first configuration C1 can be selected when the control stem 1 is pushed back from the second position P2 to the first position P1.

By pushing the control stem 1 back in the second direction D2, the latter simultaneously drives the first and second setting levers 2, 3 so as to reconfigure the device 200 for selecting functions in the first configuration C1. This is made possible by the fact that, in the third configuration C3, the third stud 23 is in abutment in the elongate cutout 31.

It follows that the beak 61 of the pawl member 6, which is located on the path of the third stud 23 in the third configuration C3, is once again out of the range of the third stud 23 by virtue of the cooperation of the fourth stud 63 with the profile of the cutout 99.

Passage from the Fourth Configuration C4 to the First Configuration C1:

From the fourth configuration C4, just as from the third configuration C3, the second configuration C2 cannot be selected by pushing back the control stem 1 in the second direction D2. Only the third and first configurations C3 and C1 can be achieved by pushing back the control stem 1.

In this fourth configuration C4, the relative position of the first and second setting levers 2, 3 is identical to that known in the third configuration C3. The kinematics of the setting levers 2, 3 during the return to the first configuration C1 from the fourth configuration C4 are therefore substantially identical to those known from the third configuration C3. The control stem 1 thus drives the first setting lever 2, which drives the second setting lever 3 by virtue of the third stud 23 in contact with the elongate cutout 31.

In the same way, the beak 61 of the pawl member 6 is removed from the path of the third stud 23 by virtue of the cooperation of the fourth stud 63 with the profile of the cutout 99.

A second embodiment of a timepiece 1000' is described below with reference to FIGS. 15 to 21.

Preferably, the second embodiment differs from the first embodiment only in some of its features.

Thus, the references of elements of the second embodiment are derived from those of elements of the first embodiment (having identical or substantially identical structures and/or identical or substantially identical functions) by the addition of an apostrophe "'".

The timepiece 1000' is for example a watch, in particular a wristwatch.

The timepiece 1000' comprises a timepiece movement 900' intended to be mounted in a timepiece casing or case in order to protect it from the external environment.

The timepiece movement 900' may be an electronic movement or a mechanical movement, in particular an automatic movement. The timepiece movement 900' comprises a timepiece mechanism 800'.

The timepiece 1000', in particular the timepiece movement 900', notably the timepiece mechanism 800', comprises a device 200' for selecting timepiece functions. The timepiece 1000', in particular the timepiece movement 900', notably the timepiece mechanism 800', preferably also comprises:

- a winding drivetrain,
- a first adjustment drivetrain, and
- a second adjustment drivetrain.

The device 200' for selecting timepiece functions comprises mainly:

- a setting lever device 150', and
- a frame 100'.

Advantageously, the setting lever device 150' comprises a lever 2', in particular a setting lever 2', mounted movably on the frame 100' and a lever 3' mounted movably on the frame 100 or on the setting lever 2', and the selection device 200' also comprises:

- a first position indexing device 4' arranged so as to act on the setting lever 2', and a second position indexing device 5' arranged so as to act on the lever 3'.

Alternatively or in addition, the device 200' for selecting timepiece functions may comprise an interface element 1, in particular a control stem 1, and the setting lever device 150' may be arranged so as to define:

n stable positions of the interface element 1, where n≥3, and m selection configurations of the selection device 200', where m≥n+1.

This second embodiment differs mainly from the first by the arrangement of the pawl member and by the device for selecting the different winding and adjustment trains, which has the particular feature of not comprising a control mobile.

Moreover, the second embodiment differs from the first embodiment in that the second position indexing device 5' comprises a second spring 51' provided with a second functional surface 52' (forming a double beak) and a fifth stud 34' secured to the second setting lever 3'. The cooperation of the second functional surface 52' with the fifth stud 34' makes it possible to define the three stable angular positions of the second setting lever 3'.

Compared with the first embodiment, the pawl member 6' of this second embodiment comprises a fourth functional surface 63' instead of a stud. This fourth functional surface is intended to cooperate with the profile formed by the perimeter of the cutout 99' in the frame 100'. The kinematics of this pawl member, and those of the components with which it is able to cooperate, are identical to those known from the first embodiment.

The control of the two levers 12', 14' of this second embodiment is not carried out here via a control mobile. They are controlled directly by the first and second setting levers 2', 3'. Nevertheless, the different winding and adjustment trains operate similarly to the manner known from the first embodiment.

Furthermore, just like the first embodiment, a second profile 24', or more particularly in this case a sixth stud 24', is also able to cooperate with the lever 14'.

Moreover, this second embodiment also has the particular feature of having the second stud 22', the third stud 23' and the sixth stud 24' arranged coaxially.

Figure 16:
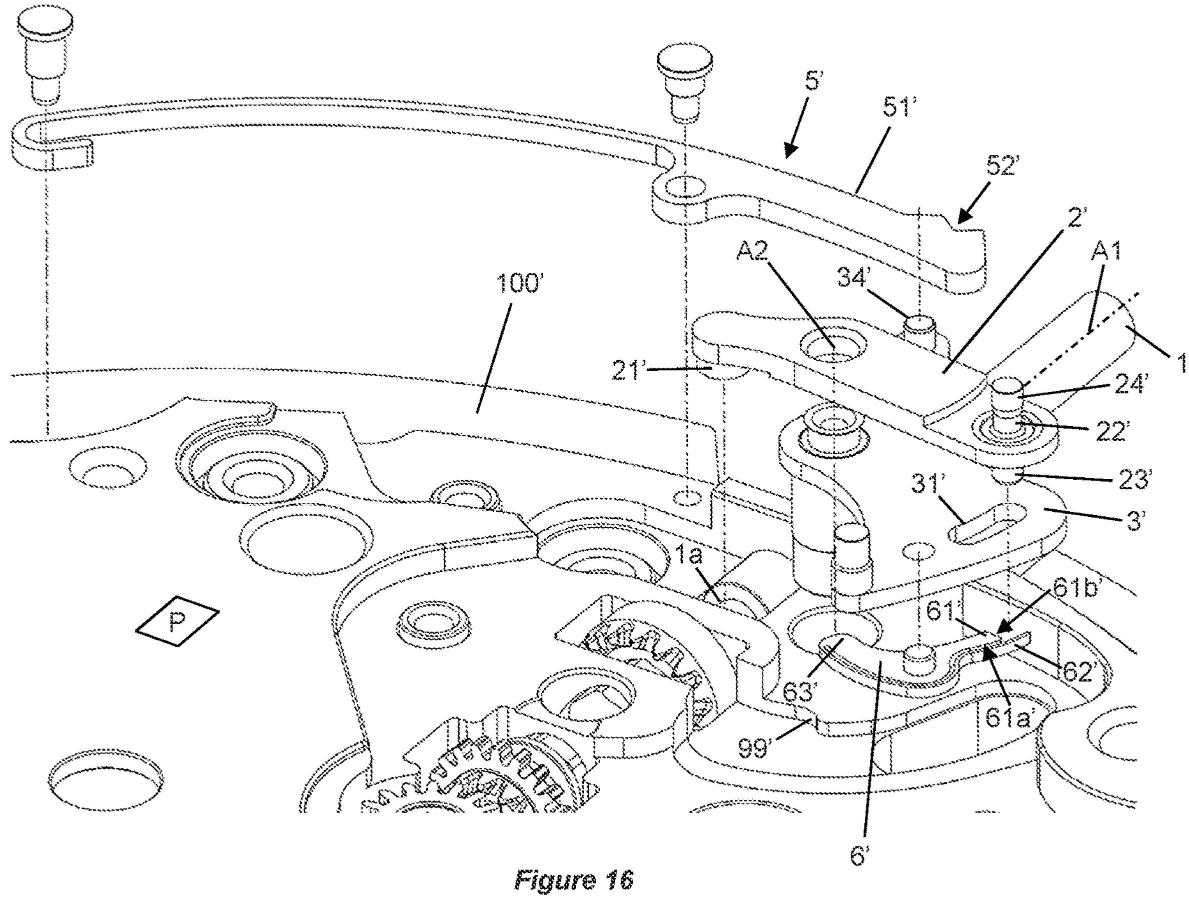
FIGS. 16 to 21 are detail illustrations of the second embodiment of the timepiece.

Just like the first embodiment, the device 200' for selecting functions according to the second embodiment allows the selection of the different functions of the timepiece mechanism 800' by virtue of a first setting lever 2' and a second setting lever 3' (as shown in FIG. 16) that can be set respectively in four separate configurations C1, C2, C3 and C4 defined by three axial positions P1, P2 and P3 of the control interface element 1.

Apart from the abovementioned design differences between the two embodiments, the selection of the different configurations of this second embodiment is substantially identical or equivalent to that of the first embodiment. As a result, the entire description of the first embodiment describing the passages from one configuration to another can be transposed to this second embodiment, independently of the few abovementioned structural differences.

Figure 17:
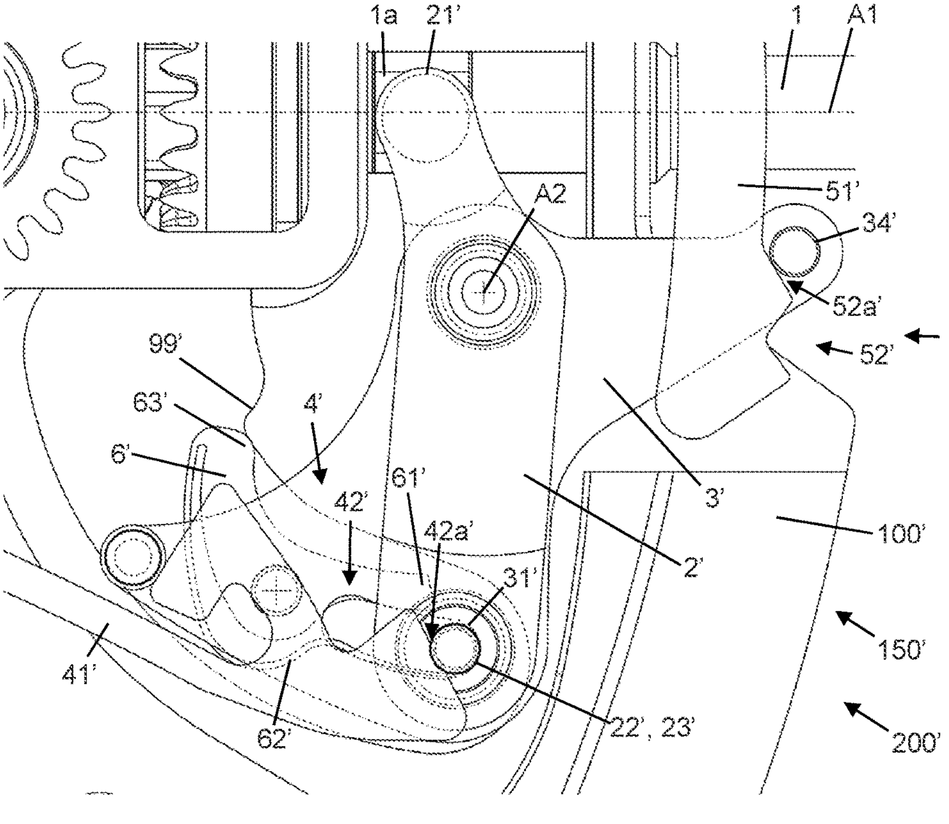

FIG. 17 illustrates the device 200' for selecting functions in the first configuration C1.

Figure 18:
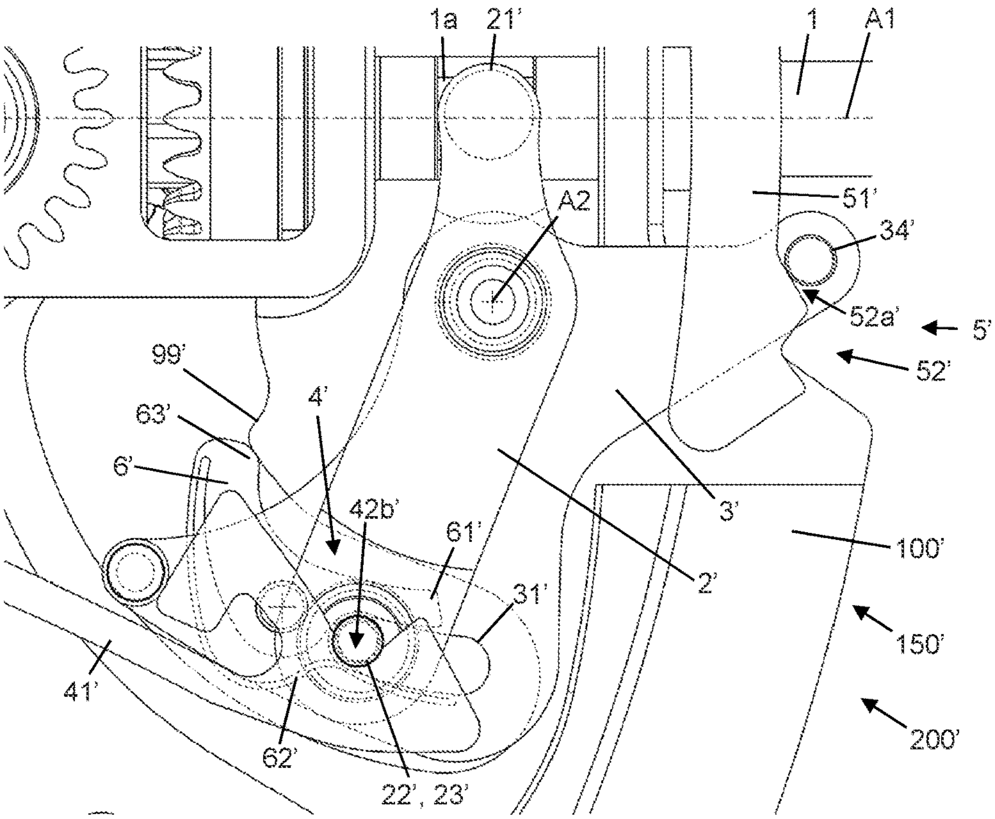

FIG. 18 illustrates the device 200' for selecting functions in the second configuration C2.

Figure 19:
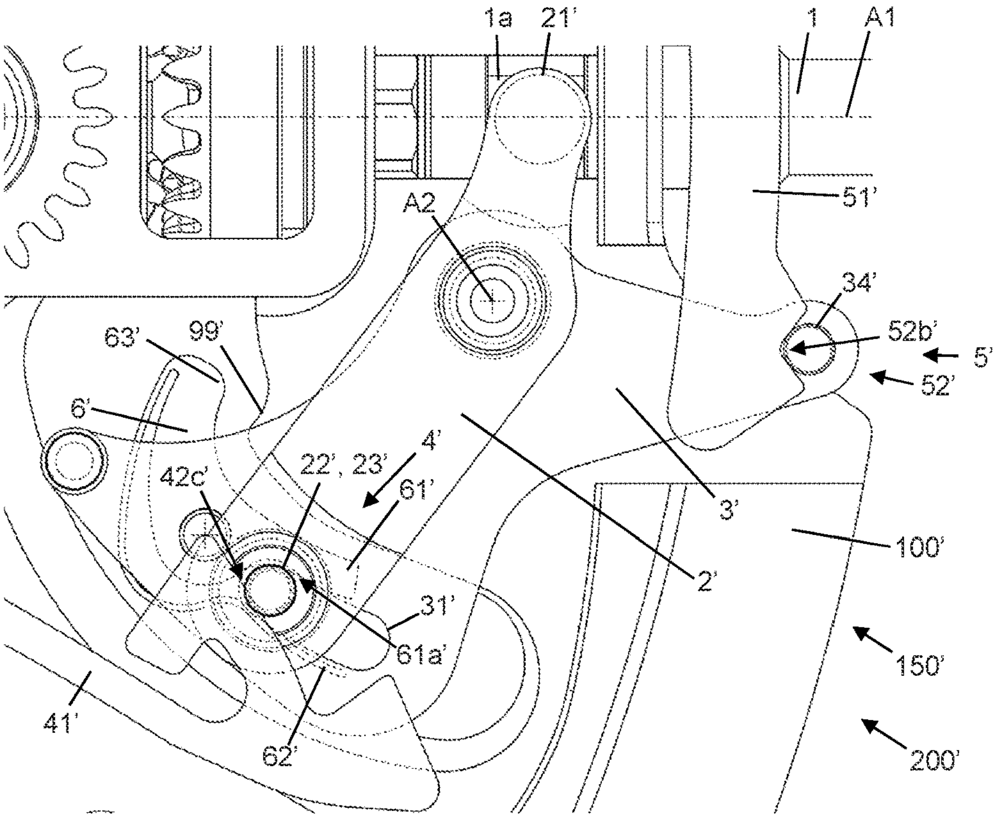

FIG. 19 illustrates the transient, unstable state in which the control stem 1 of the device 200' for selecting functions is temporarily in the third position P3, during the passage from the second configuration C2 to the third configuration C3.

Figure 20:
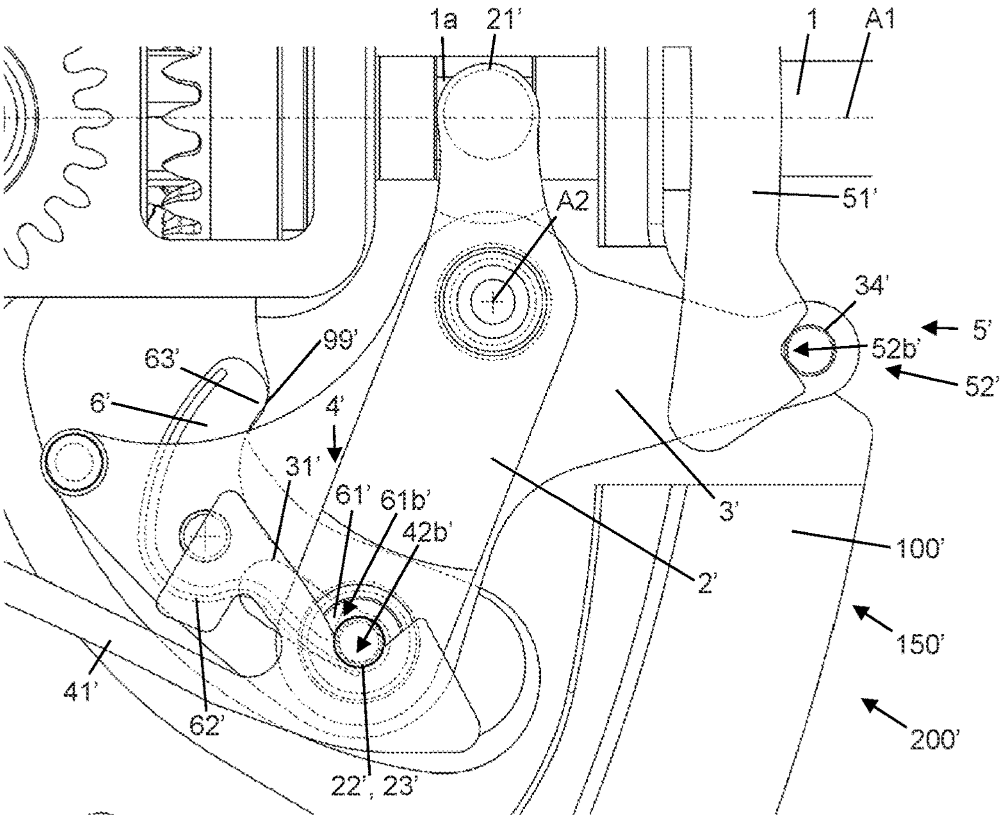

FIG. 20 illustrates the device 200' for selecting functions in the third configuration C3.

Figure 21:
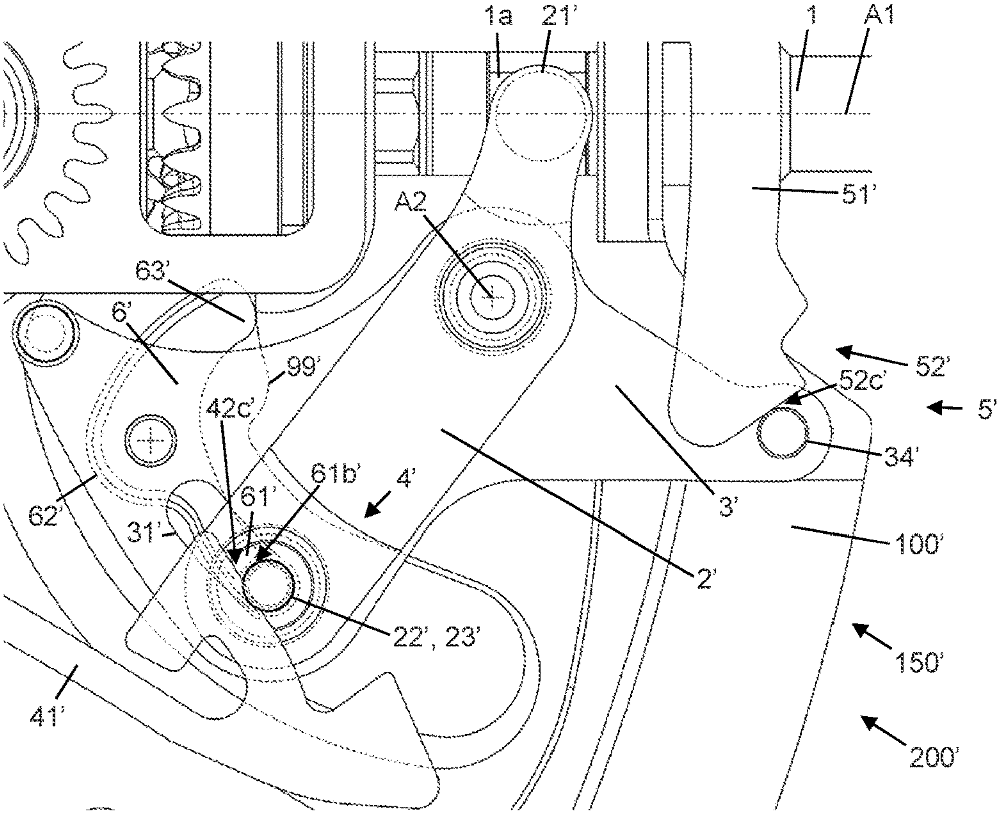

FIG. 21 illustrates the device 200' for selecting functions in the fourth configuration C4.

A manner of carrying out a method for operating a device for selecting timepiece functions as mentioned above or a timepiece mechanism as mentioned above or a timepiece movement as mentioned above or a timepiece as mentioned above is described below.

The method comprises the following steps:

the selection device 200; 200' is configured in the second configuration C2 when the interface element 1 is moved from the first stable position P1 to the second, intermediate stable position P2, and the selection device 200; 200' is configured in a third configuration C3 when a back-and-forth movement of the interface element 1 from the second, intermediate stable position P2, in particular in the first traction direction, and back into the second, intermediate stable position P2 is carried out.

Advantageously, the selection device 200; 200' is configured in a third configuration C3 when the interface element 1 is moved from the third stable position P3 to the second, intermediate stable position P2.

The different possible manipulations or actions on the interface element 1 which make it possible to select the different configurations of the selection device are explained below.

Passage from the first configuration C1 to the second configuration C2:

The first position P1 of the interface element 1 defines the first configuration C1 of the device 200; 200' for selecting functions. From this first position P1, when the user pulls the interface element 1 in the first direction D1, the latter arrives in the second position P2, thereby setting the device 200; 200' for selecting functions in the second configuration C2.

Passage from the Second Configuration C2 to the Third Configuration C3:

From the second position P2, when the selection device 200; 200' is in the second configuration C2, it is possible to pull the interface element 1 once again in the first direction D1. The device 200; 200' for selecting functions is then set in the third configuration C3 when the interface element 1 reaches a third position P3 or a position substantially close to P3, which is unstable in this case. As a result, when the interface element 1 is released by the user, it returns to the second stable position P2. The interface element 1 therefore travels back and forth in order to set the device in this third configuration C3.

Passage from the Third Configuration C3 to the Fourth Configuration C4:

To configure the device 200; 200' for selecting functions in the fourth configuration C4, it is necessary for it first of all to be configured in the third configuration C3. Thus, once this third configuration C3 has been selected, renewed traction on the interface element 1 makes it possible to set the selection device 200; 200' in the fourth configuration C4. During this action, the interface element 1 reaches the third position P3, which in this case is stable.

Passage from the Fourth Configuration C4 to the Third Configuration C3:

The third stable position P3 of the interface element 1 therefore defines the fourth configuration C4 of the selection device. From this third and final position P3, by pushing the interface element 1 back to the second position P2, the selection device 200; 200' can only be reconfigured in the third configuration C3.

Passage from the Third Configuration C3 to the First Configuration C1:

Regardless of the configuration in which the device 200; 200' for selecting functions is located beforehand, it is impossible to configure it in the second configuration C2 by pushing the interface element 1 back in the second direction D2. The sequence of the mechanism in this case requires the selection of this second configuration C2 to be carried out by pulling the interface element 1 from the first position P1. As a result, when the interface element 1 is pushed from the second position P2, it returns inevitably to the first position P1, thereby setting the selection device 200; 200' in the first configuration C1.

Passage from the Second Configuration C2 to the First Configuration C1:

When the device 200; 200' for selecting functions is set in the second configuration C2, pressure on the interface element 1 in the second direction D2 makes it possible to achieve the first position P1, thereby setting the selection device 200; 200' in the first configuration C1.

Thus, from the first position P1 of the interface element 1, each pull exerted on the interface element 1 makes it possible to successively select the different configurations of the selection device in the predefined order C1, C2, C3 and C4.

Advantageously, the selection device 200; 200' can only be set in the fourth configuration C4 corresponding to the function of setting the time after a manipulation of the interface element 1 that is characterized by a back-and-forth movement has been done, this preventing the user from stopping the movement accidentally if the mechanism is provided with a "stop seconds" or a "balance wheel stop".

Preferably, the control interface controlling the mechanism or the selection device for selecting the different functions or configurations of the selection device involved in said mechanism is identical regardless of the embodiment or embodiment variant.

The device for selecting functions makes it possible to make operational the different trains of the timepiece mechanism respectively for winding and adjustment of the different functions of the watch. These trains are for example identical or substantially identical regardless of the embodiment.

In the embodiments described, the selection devices are used to select particular timepiece functions. However, a selection device according to the invention can be used to select all the desired timepiece functions that can be arranged within a timepiece. These may be timepiece functions, in particular schedule or calendar functions or time-related functions. They may also be control or adjustment functions, for example of an alarm.

In the embodiments, it is for example possible to select manual winding, a function of two-way adjustment of the indication of the date, a function of one-way adjustment of the indication of the day, and a function of setting the time, while providing an intuitive interface, the apparent operation of which for the user is substantially identical to that of a known interface of a three-position mechanism.

In the embodiments and variants described, the number of positions of the indexing element is three and the number of configurations of the selection device is four. However, these numbers can be modified, in particular increased. For example, it would be quite possible to construct a variant of a selection device comprising an additional position for the interface element 1, thereby making it possible to define at least one new, additional configuration. This additional configuration could, for example, be achieved by pulling the interface element 1 once again from the third position P3. The relative movement of the two setting levers is locked in this third position P3. Additional traction on the interface element 1 would thus allow the second setting lever 3; 3' to be able to be indexed by the second indexing device 5; 5' in a new angular position. As for the first setting lever 2; 2', the third flank 42*c*; 42*c'* would just need to be lengthened in order to allow it to reach this new angular position.

Furthermore, the two configurations C2, C3 that are selectable here when the interface element 1 is disposed in the second position P2 could of course be defined by any other axial position of the interface element. The mechanism could also comprise at least two axial positions of the interface element for which two configurations are selectable. Moreover, it would also be possible for more than two configurations to be selectable for one and the same axial position of the interface element.

In a design variant of the first indexing device 4; 4', it is possible to shape the third flank 42*c*; 42*c'* such that it does not tend to return the first setting lever 2; 2' into the recess in the second flank 42*b*; 42*b'*. To this end, another elastic element could be able to return said setting lever into the recess in the second flank 42*b*; 42*b'*.

The fifth return spring 62; 62' for the pawl member 6; 6' could also alternatively bear on the frame 100; 100' rather than being on the first or second setting lever. Conversely, the fifth spring 62; 62' could also be built into the frame 100; 100' and bear against the pawl member 6; 6'.

Rather than pivoting on the second setting lever 3; 3', the pawl member 6; 6' could be simply in the form of a flexible element or of a built-in spring, which could be for example contained in said setting lever. This spring would then be shaped in the form of a beak that is able to cooperate with the frame 100; 100' and the first setting lever 2; 2'.

In the embodiments and variants described, the first and second setting levers are arranged coaxially. Of course, it may be possible for these setting levers not to be arranged in this way. The second setting lever 3; 3' may thus be akin to a pivoted lever, whether it is disposed coaxially with the first setting lever 2; 2' or not.

As described above, the selection of the third configuration C3 requires the interface element 1 to be pulled from the second position P2 to the third, in this case unstable, position P3 and then released by the user in order that it can return to the second position P2. In one design variant, it is conceivable for the position known as the unstable position not to be located exactly at the third position P3. Specifically, it could very easily be located ahead of or behind this third position P3. Ultimately, the amplitude of this back-and-forth movement of the interface element 1 needs to be just enough for the pawl member 6; 6' to be able to lock the relative movement of the two setting levers following this action.

In another embodiment that is not shown, the timepiece mechanism 800; 800' could comprise as many winding and/or adjustment trains as there are configurations that are selectable by the device 200; 200' for selecting functions. In other words, each selection of a given configuration could correspond to the engagement of a specific and dedicated winding or adjustment train.

Of course, in another embodiment that is not shown, the timepiece mechanism 800; 800' could comprise a manual winding drive which could be engaged not by a vertical clutch, but via a sliding pinion that rotates as one with the control stem and is able to move in the direction of the control stem.

In the embodiments and variants described, a control stem 1 acts as an interface element on the first setting lever 2; 2' which is directly engaged with the interface element 1. Of course, the first setting lever 2; 2' could be connected indirectly to the interface element 1, for example by way of one or more levers or stems. In a first example, the selection of functions could be undertaken by virtue of a crown wheel arranged on a secondary stem parallel to the interface element 1, by way of a means kinematically connecting the two stems. This type of arrangement is found in particular in designs in which it is necessary to offset the position of the crown wheel with respect to that of the stem of the movement. In a second example, the selection could be undertaken by virtue of a crown wheel arranged on a secondary stem parallel to the axis of the hands, by way of a means for controlling the movement in translation of a stem akin to that of the interface element 1 described in this document via the movement in translation of this alternative interface means.

Following the same logic, it is quite conceivable for this device for selecting functions to also be actuated by virtue of another interface means, for example a rotating bezel. In other words, the various translational movements of the interface element 1, allowing the selection of the various configurations of the selecting device, could be replaced by rotational movements of another interface means, for example, a rotating bezel.

Although certainly less intuitive for the user, the directions D1 and D2 described thus far could also be reversed. The operation of the mechanism as a whole would consequently also be reversed.

The elements of the first and second indexing devices 4; 4', 5; 5' may be shaped with any geometries so as to allow the stable positioning of the setting lever device 150; 150' comprising the first and second setting levers 2; 2', 3; 3'. In particular, the elements of the first and second indexing devices 4; 4', 5; 5' may of course be shaped with any geometries so as to allow the stable positioning of the first setting lever 2; 2' for at least a first stable position of the interface element 1 and to allow the stable positioning of the second setting lever 3; 3' for at least a second stable position of the interface element 1.

Preferably, whatever the embodiment or variant, the selecting device or the timepiece mechanism comprises a single interface element 1, in particular a single control stem 1, that can be manipulated by the user. Thanks to the manipulation of this single interface element 1 the user can:

- select each and every configuration of the selecting device,
- select some or each and every timepiece functions, and
- actuate each of these timepiece functions.

Preferably, whatever the embodiment or variant, the selecting device or the timepiece mechanism is arranged so that each configuration of the selecting device is defined by a translation movement of the interface element 1 and, in each of these configurations, the actuation of the timepiece function is carried out by a rotational movement of the interface element. In other words, preferably, regardless of the configuration, the user cannot change the configuration of the selecting device by rotating the interface element 1.

Preferably, whatever the embodiment or the variant, for each configuration of the selecting device, the timepiece mechanism makes it possible to act on one or more timepiece functions by the rotation of the interface element 1, in particular according to its direction of rotation.

Preferably again, whatever the embodiment or the variant, the selecting device or the timepiece mechanism is arranged so that, from the first position P1 of the interface element 1, pulling actions carried out on the interface element 1 allow to select successively the different configurations of the selecting device, in particular according to the predefined order C1, C2, C3 and C4. Thus, the user only needs to perform pulling actions on interface element 1 to reach the different configurations of the selecting device. Preferably still, whatever the embodiment or the variant, the selecting device or the timepiece mechanism is arranged so that the last configuration that can be reached, by application of the pulling actions carried out on the interface element 1, is a configuration corresponding to the time setting.

Throughout this document, a "setting lever" is understood preferably to be a lever, the position of which is controlled by an interface element, in particular a control stem, directly for example via a setting lever stud and cooperating with a groove made in the control stem. A "setting lever" is preferably also understood to be a lever, the position of which is controlled directly by the action of another setting lever.

Throughout this document, a "top view" means a view from the face of the movement situated on the dial side.

Throughout this document, "indexing of an element", "angular indexing of an element" or "position indexing of an element" means the definition of different stable positions of an element. These stable positions may be separated by a continuum of unstable intermediate positions. Between two stable positions or two indexed positions or two indexing positions, the element passes transiently through a continuum of unstable or less stable intermediate positions.

A "stable position" denotes a given position of the interface element 1, of the first setting lever or of the second setting lever (or lever), once the interface element 1 has been released by the user. In particular, "stable axial position" denotes a given axial position of the interface element 1 once the latter has been released by the user.

This "stable position" is defined by the first indexing device 4; 4' and/or by the second indexing device 5; 5'.

An "unstable position" denotes a given position of the interface element 1 which is defined exclusively by an action maintained by a user. Once the interface element 1 is released, it returns to a stable position, different than the unstable position.

A "setting lever device" 150; 150' means a device comprising at least two pivoted levers that are connected together and are movable relative to one another. A first lever 2; 2' may comply with the definition of "setting lever", the latter being engaged directly with a control stem. A second lever 3; 3' may likewise comply with the definition of setting lever, on the understanding that the latter has a shape substantially equivalent to that of the first lever 2; 2' and that this second lever 3; 3' is pivoted coaxially with the first lever 2; 2'. However, this second lever is not necessarily pivoted coaxially with the first lever.

Throughout this document, the "configuration" of the device for selecting functions denotes a very specific disposition or shaping of the elements involved in the mechanism, making it possible to engage the winding and/or adjustment trains or make them operational.

As regards the "functions" of the movement on which it is possible to act with the mechanism, throughout this document, a "function" denotes any manual winding of an energy accumulation spring, all corrections of schedule or time-related indications, and more generally any additional functions that can be arranged on a timepiece.

A "sequential" mechanism means here a mechanism capable of selecting different configurations of a selection device for one and the same stable position of a control member.

The device according to the invention may be referred to as a "semi-sequential" mechanism on the understanding that it makes it possible both to select different configurations of a selection device via the movement of an interface element between various stable positions, and at least one configuration of said selection device via a back-and-forth movement of the interface element, in particular from a given stable position to this same stable position.

Throughout this document, the terms "adjustment function" and "correction function" are used synonymously.

Throughout this document, the studs preferably have a cylindrical shape. More generally, a stud of an element consists preferably of a finger extending perpendicularly or substantially perpendicularly to a plane on which the rest of the element extends. For example, a stud is formed by a lug or a peg.

Throughout the document, the cooperation of the first and second desmodromic connecting elements makes it possible in particular to configure the selecting device from one given configuration to another. In particular, it makes it possible, on passing from one configuration to another, to move the lever 402 into different angular positions under the effect of the movement of the lever 14, independently of any return spring.

In other words, a "desmodromic connection" means a connection arranged so as to make it possible to define the position of the second lever 402 starting from the position of the first lever 14 without using a return spring for returning the second lever against the first lever. This desmodromic connection makes it possible to define, unequivocally, a position of the second lever for each of several positions of the first lever. Thus, this does not exclude that in one or more particular positions of the first lever, the position of the second lever is not defined unequivocally (see for example the configuration of FIG. 11), in particular that the second lever can move angularly over a given range without movement of the first lever.

A movement of the lever 402 effected independently of the movement of the lever 14 is nevertheless possible, in particular when the selecting device is configured in the third configuration C3. In this third configuration, the first and second desmodromic connecting elements are arranged such that they allow the lever 402 to be positioned in a third angular position.

In the different embodiments and variants, the interface element may be indexed in position:

- by the first indexing device in one or more first positions, and
- by the second indexing device in one or more second positions, exclusively.

Moreover, the interface element may be indexed in position, in one or more third positions:

- by the first indexing device and by the second indexing device redundantly, or
- by the first indexing device and by the second indexing device in a complementary manner.

The solutions described present a manner of operation similar to that of known mechanisms while affording the possibility of selecting a larger number of adjustment configurations. In addition, this solution makes it possible to remedy all of the drawbacks identified in the prior art.

The solutions described allow rapid adjustment of several display functions, in particular several display functions of a calendar. The solutions described make it possible for example to benefit from rapid and two-way adjustment of an indication of the date, and adjustment of an indication of the days of the week.

The solutions described make it possible to implement a single interface means having an intuitive manner of actuation, while allowing the adjustment of a large number of functions.

The invention claimed is:

1. A selection device for selecting timepiece functions, comprising:

- a setting lever device, and
- a frame,
- the setting lever device comprising a setting lever mounted movably on the frame and a lever mounted movably on the frame or on the setting lever,
- a first position indexing device arranged so as to act on the setting lever, and
- a second position indexing device arranged so as to act on the lever,
- wherein the selection device comprises a pawl member arranged so as to secure the setting lever and the lever.

2. The selection device as claimed in claim 1, wherein the selection device comprises an interface element, and wherein the setting lever is engaged directly with the interface element.

3. The selection device as claimed in claim 2, wherein the setting lever device, the first position indexing device, and the second position indexing device are arranged so that a stable position of the interface element is determined either by the first position indexing device or by the second position indexing device.

4. The selection device as claimed in claim 2, wherein the interface element is a control stem, the setting lever being engaged directly with the control stem via a first setting lever stud fitted in a groove of the control stem.

5. The selection device as claimed in claim 1, wherein the setting lever and the lever are pivoted about a same axis.

6. The selection device as claimed in claim 1, wherein the pawl member is pivoted on the lever and arranged so as to cooperate with a second stud of the setting lever.

7. The selection device as claimed in claim 6, wherein the selection device comprises an interface element, and wherein the setting lever is engaged directly with the interface element, and wherein the lever comprises an elongate cutout cooperating with the second stud of the setting lever, so as to kinematically connect the setting lever and the lever during a movement of the interface element.

8. The selection device as claimed claim 7, wherein the pawl member is arranged so as to cooperate with the second stud through the elongate cutout formed in the lever.

9. The selection device as claimed in claim 1, wherein the frame comprises a profile cooperating with the pawl member so as to at least partially control a position of the pawl member depending on a position of the setting lever, a position of the lever, or both a position of the setting lever and a position of the lever.

10. The selection device as claimed in claim 1, wherein the first position indexing device comprises a first spring provided with a first functional surface and a third stud of the setting lever, the first functional surface and the setting lever cooperating by contact.

11. The selection device as claimed in claim 10, wherein the first functional surface cooperates by contact with the third stud.

12. The selection device as claimed in claim 1, wherein the second position indexing device comprises a second spring provided with a second functional surface and a mobile kinematically connected to the lever, the mobile comprising a third functional surface cooperating with the second functional surface.

13. The selection device as claimed in claim 12, wherein the mobile is in meshing engagement with the lever.

14. The selection device as claimed in claim 1, wherein the second position indexing device comprises a second spring provided with a second functional surface and a fourth stud of the lever, the second functional surface and the lever cooperating by contact.

15. The selection device as claimed in claim 14, wherein the second functional surface and the lever cooperates by contact with the fourth stud.

16. A timepiece mechanism comprising a device for selecting timepiece functions as claimed in claim 1.

17. A timepiece movement comprising the timepiece mechanism as claimed in claim 1.

18. A timepiece comprising the timepiece movement as claimed in claim 17.

19. The selection device as claimed in claim 1, wherein the setting lever device comprises the pawl member.

20. A selection device for selecting timepiece functions, comprising:

a setting lever device, and a frame, the setting lever device comprising a setting lever mounted movably on the frame and a lever mounted movably on the frame or on the setting lever, a first position indexing device arranged so as to act on the setting lever, and a second position indexing device arranged so as to act on the lever, wherein the setting lever and the lever are pivoted about a same axis.

21. A selection device for selecting timepiece functions, comprising:

a setting lever device, and a frame, the setting lever device comprising a setting lever mounted movably on the frame and a lever mounted movably on the frame or on the setting lever, a first position indexing device arranged so as to act on the setting lever, and a second position indexing device arranged so as to act on the lever, wherein the second position indexing device comprises a second spring provided with a second functional surface and a mobile kinematically connected to the lever, the mobile comprising a third functional surface cooperating with the second functional surface.

22. A selection device for selecting timepiece functions, comprising:

a setting lever device, and a frame, the setting lever device comprising a setting lever mounted movably on the frame and a lever mounted movably on the frame or on the setting lever, a first position indexing device arranged so as to act on the setting lever, and a second position indexing device arranged so as to act on the lever, wherein the first position indexing device comprises a first spring provided with a first functional surface and a third stud of the setting lever, the first functional surface and the setting lever cooperating by contact, and wherein the first functional surface cooperates by contact with the third stud.

23. A selection device for selecting timepiece functions, comprising:

a setting lever device, and a frame, the setting lever device comprising a setting lever mounted movably on the frame and a lever mounted movably on the frame or on the setting lever, a first position indexing device arranged so as to act on the setting lever, and a second position indexing device arranged so as to act on the lever, wherein the second position indexing device comprises a second spring provided with a second functional surface and a fourth stud of the lever, the second functional surface and the lever cooperating by contact, and wherein the second functional surface cooperates by contact with the fourth stud.

* * * * *